US012018104B2

(12) United States Patent
Hartmann-Thompson et al.

(10) Patent No.: US 12,018,104 B2
(45) Date of Patent: Jun. 25, 2024

(54) COPOLYMERS WITH CATIONIC, NITROGEN-CONTAINING GROUPS AND ANION EXCHANGE MEMBRANES MADE THEREFROM

(71) Applicant: 3M INNOVATIVE PROPERTIES COMPANY, St. Paul, MN (US)

(72) Inventors: Claire Hartmann-Thompson, Lake Elmo, MN (US); Mark J. Pellerite, Woodbury, MN (US); John C. Thomas, St. Paul, MN (US); Marina M. Kaplun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 645 days.

(21) Appl. No.: 17/309,391

(22) PCT Filed: Dec. 5, 2019

(86) PCT No.: PCT/IB2019/060493
§ 371 (c)(1),
(2) Date: May 25, 2021

(87) PCT Pub. No.: WO2020/121135
PCT Pub. Date: Jun. 18, 2020

(65) Prior Publication Data
US 2022/0127396 A1 Apr. 28, 2022

Related U.S. Application Data

(60) Provisional application No. 62/777,813, filed on Dec. 11, 2018, provisional application No. 62/861,079, filed on Jun. 13, 2019.

(51) Int. Cl.
*H01M 50/497* (2021.01)
*B01D 71/28* (2006.01)
*B01D 71/40* (2006.01)
*B01J 41/14* (2006.01)
*C08F 8/30* (2006.01)
*C08F 212/08* (2006.01)
*C08F 212/14* (2006.01)
*C25B 13/08* (2006.01)
*H01M 50/414* (2021.01)

(52) U.S. Cl.
CPC .......... *C08F 212/18* (2020.02); *B01D 71/281* (2022.08); *B01D 71/401* (2022.08); *B01J 41/14* (2013.01); *C08F 8/30* (2013.01); *C08F 212/08* (2013.01); *C25B 13/08* (2013.01); *H01M 50/414* (2021.01); *H01M 50/497* (2021.01)

(58) Field of Classification Search
None
See application file for complete search history.

(56) References Cited

U.S. PATENT DOCUMENTS

| 3,935,086 A | 1/1976 | Misumi |
| 5,118,717 A * | 6/1992 | Hodgdon ............... C08J 5/2256 |
| | | 564/291 |
| 7,816,477 B2 | 10/2010 | Suwa |
| 9,481,939 B2 | 11/2016 | Masel |
| 9,580,824 B2 | 2/2017 | Masel |
| 9,849,450 B2 | 12/2017 | Masel |
| 9,945,040 B2 | 4/2018 | Masel |
| 2012/0024697 A1 | 2/2012 | Antheums |
| 2015/0111128 A1 | 4/2015 | Matsuda |
| 2017/0183789 A1 | 6/2017 | Matthews |
| 2017/0189898 A1 | 7/2017 | Masel |

FOREIGN PATENT DOCUMENTS

| CN | 102050911 | 5/2011 |
| CN | 102382293 | 3/2012 |
| CN | 102690392 | 9/2012 |
| CN | 103030826 | 4/2013 |
| CN | 105694078 | 6/2016 |
| CN | 106654327 | 5/2017 |
| CN | 107266629 | 10/2017 |
| DE | 2506085 | 8/1976 |
| FR | 2300595 | 9/1976 |
| JP | 2015125888 | 7/2015 |
| WO | WO 2016-039999 | 3/2016 |
| WO | WO 2016-064440 | 4/2016 |
| WO | WO 2017-176598 | 10/2017 |
| WO | WO 2018-118877 | 6/2018 |
| WO | WO 2020-250057 | 12/2020 |
| WO | WO 2021-038342 | 3/2021 |

OTHER PUBLICATIONS

Appel, "Frontiers, Opportunities, and Challenges in Biochemical and Chemical Catalysis of CO2 Fixation", Chemical Reviews, Jun. 2013, vol. 113, vol. 8, pp. 6621-6658.
Bard, "Electrochemical Reactions of Carbon Dioxide", Encyclopedia of Electrochemistry, pp. 202-225 (2006).
Costentin, "Catalysis of the electrochemical reduction of carbon dioxide", Chemical Society Review, 2013, vol. 42, No. 6, pp. 2423-2436.
Dimeglio, "Selective Conversion of $CO_2$ to CO with High Efficiency Using an Inexpensive Bismuth-Based Electrocatalyst", Journal of the American Chemical Society, Jun. 2013, vol. 135, No. 24, pp. 8798-8801.
Gattrell, "A review of the aqueous electrochemical reduction of $CO_2$ to hydrocarbons at copper", Journal of Electroanalytical Chemistry, Aug. 2006, vol. 594, No. 1, pp. 1-19.
Hugar, "Imidazolium Cations with Exceptional Alkaline Stability: A Systematic Study of Structure-Stability Relationships", Journal of the American Chemical Society, Jun. 2015, vol. 137, No. 27, pp. 8730-8737.

(Continued)

*Primary Examiner* — Wyatt P McConnell

(57) ABSTRACT

A crosslinkable copolymer is provided. The crosslinkable copolymer has pendant cationic nitrogen-containing groups with some, but not all, of these pendant groups further including a (meth)acryloyl group. The (meth)acryloyl groups can react to form a crosslinked copolymer that is ionically conductive. The crosslinked copolymer can be used to provide an anion exchange membrane that can be used in electrochemical cells such as fuel cells, electrolyzers, batteries, and electrodialysis cells.

15 Claims, No Drawings

(56) References Cited

OTHER PUBLICATIONS

Inglis, "Electrocatalytic pathways towards sustainable fuel production from water and $CO_2$", Coordination Chemistry Reviews, Nov. 2012, vol. 256, No. 21-22, pp. 2571-2600.

Kondratenko, "Status and perspectives of $CO_2$ conversion into fuels and chemicals by catalytic, photocatalytic and electrocatalytic processes", Energy & Environmental Science, 2013, vol. 6, pp. 3112-3135.

Kutz, "Sustainion Imidazolium-Functionalized Polymers for Carbon Dioxide Electrolysis", Energy Technology, Jun. 2017, vol. 5, No. 6, pp. 929-936.

Lau, "New Insights into the Role of Imidazolium-Based Promoters for the Electroreduction of $CO_2$ on a Silver Electrode", Journal of the American Chemistry Society, Jun. 2016, vol. 138, No. 25, pp. 7820-7823.

Li, "Novel anion exchange membranes based on polymerizable imidazolium salt for alkaline fuel cell applications", Journal of Materials Chemistry, 2011, vol. 21, pp. 11340-11346.

Lim, "A review on the electrochemical reduction of $CO_2$ in fuel cells, metal electrodes and molecular catalysts", Catalysis Today, Sep. 2014, vol. 233, pp. 169-180.

Lin, "Alkaline Stable C2-Substituted Imidazolium-Based Anion-Exchange Membranes", Chemistry of materials, 2013, vol. 25, pp. 1858-1867.

Long, "Hydroxide Degradation Pathways for Imidazolium Cations: A DFT Study", The Journal of Physical Chemistry C, Apr. 2014, vol. 118, No. 19, pp. 9880-9888.

Ma, "A short review of catalysis for $CO_2$ conversion", Catalysis Today, Nov. 2009, vol. 148, No. 3-4, pp. 221-231.

Matsubara, "Thermodynamic Aspects of Electrocatalytic $CO_2$ Reduction in Acetonitrile and with an Ionic Liquid as Solvent or Electrolyte", American Chemical Society (ACS) Catalysis, Nov. 2015, vol. 5, No. 11, pp. 6440-6452.

Medina-Ramos, "Efficient Conversion of $CO_2$ to CO Using Tin and Other Inexpensive and Easily Prepared Post-Transition Metal Catalysts", Journal of the American Chemical Society, Feb. 2015, vol. 137, No. 15, pp. 5021-5027.

Oh, "Ionic liquids enhance the electrochemical $CO_2$ reduction catalyzed by $MoO_2$", Chemical Communication, 2015, vol. 51, No. 71, pp. 13698-13701.

Pellerite, "Imidazolium-Functionalized Polymer Membranes for Fuel Cells and Electrolyzers", The Electrochemical Society (ECS)—Transactions, 2017, vol. 80, No. 8, pp. 945-956.

Qiao, "A review of catalysts for the electroreduction of carbon dioxide to produce low-carbon fuels", Chemical Society Reviews, Nov. 2014, vol. 43, No. 2, pp. 631-675.

Rosen, "In Situ Spectroscopic Examination of a Low Overpotential Pathway for Carbon Dioxide Conversion to Carbon Monoxide", Journal of Physical Chemistry C, Jun. 2012, vol. 116, No. 29, pp. 15307-15312.

Rosen, "Ionic Liquid-Mediated Selective Conversion of $CO_2$ to CO at Low Overpotentials", Science, Nov. 2011, vol. 334, No. 6056, pp. 643-644.

Snyder, "$CO_2$ Conversion to Chemicals with Emphasis on using Renewable Energy/Resources to Drive the Conversion", Commercializing Biobased Products: Opportunities, Challenges, Benefits, and Risks, 215-257 (2016).

Sun, "Switching the Reaction Course of Electrochemical $CO_2$ Reduction with Ionic Liquids", Langmuir, May 2014, vol. 30, No. 21, pp. 6302-6308.

Tang, "Poly(ionic liquid)s as New Materials for $CO_2$ Absorption", Journal of Polymer Science: Part A: Polymer Chemistry, 2005, vol. 43, pp. 5477-5489.

Tuli, "Effect of morphology on anion conductive properties in self-assembled polystyrene-based copolymer membranes", Journal of Membrane Science, 2018, vol. 565, pp. 213-225.

Vayenas, "Electrochemical $CO_2$ Reduction on Metal Electrodes", Modern Aspects of Electrochemistry, 89-189 (2008).

Yang, "Highly alkaline stable N1-alkyl substituted 2-methylimidazolium functionalized alkaline anion exchange membranes", Journal of Materials Chemistry A, 2015, vol. 3, pp. 8559-8565.

Ye, "Relative Chemical Stability of Imidazolium-Based Alkaline Anion Exchange Polymerized Ionic Liquids", Macromolecules, Oct. 2011, vol. 44, No. 21, pp. 8494-8503.

Zhou, "Highly selective electrocatalytic reduction of carbon dioxide to carbon monoxide on silver electrode with aqueous ionic liquids", Electrochemistry Communications, Sep. 2014, vol. 46, pp. 103-106.

International Search Report for PCT International Application No. PCT/IB2019/060493, mailed on Mar. 5, 2020, 4 pages.

* cited by examiner

COPOLYMERS WITH CATIONIC, NITROGEN-CONTAINING GROUPS AND ANION EXCHANGE MEMBRANES MADE THEREFROM

CROSS REFERENCE TO RELATED APPLICATIONS

This application is a national stage filing under 35 U.S.C. 371 of PCT/IB2019/060493, filed Dec. 5, 2019, which claims the benefit of Provisional Application Nos. 62/777,813, filed Dec. 11, 2018, and 62/861,079, filed Jun. 13, 2019, the disclosures of which are incorporated by reference in their entirety herein.

GOVERNMENT RIGHTS

This invention was made with Government support under Cooperative Agreement DE-AR0000950 awarded by DOE. The Government has certain rights in this invention.

BACKGROUND

Anion exchange membranes are useful in various electrochemical cells such as, for example, in fuel cells, electrolyzers, batteries, and electrodialysis cells. Previous anion exchange membranes have been prepared from various copolymers having cationic, nitrogen-containing groups. These copolymers have been prepared, for example, by reacting styrene/vinylbenzyl chloride copolymers with a nitrogen-containing base to provide the cationic, nitrogen-containing groups. To date, membranes formed from these copolymers typically have had inadequate mechanical strength. The membranes often are brittle and have low tensile strength.

SUMMARY

Crosslinkable copolymers having pendant, cationic, nitrogen-containing groups are provided. Some, but not all, of the pendant, cationic, nitrogen-containing groups are polymerizable (e.g., they contain a (meth)acryloyl group). That is, the crosslinkable copolymer can be crosslinked without the addition of a separate crosslinking agent such as one that is non-ionic. The crosslinked copolymers can be used to provide anion exchange membranes for use in electrochemical cells such as fuel cells, electrolyzers, batteries, and electrodialysis cells. The anion exchange membranes typically have good mechanical properties and ionic conductivity.

In a first aspect, a crosslinkable copolymer is provided. The crosslinkable copolymer contains a) first monomeric units, b) second monomeric units, and c) third monomeric units. The first monomeric units are of Formula (I).

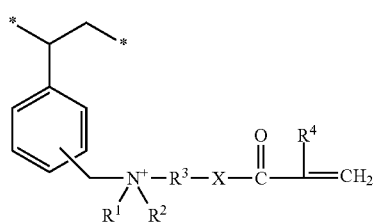

(I)

In Formula (I), group $R^1$ is an alkyl, $R^2$ is an alkyl, $R^3$ is an alkylene, X is oxy or —NR— where R is hydrogen or alkyl, and $R^4$ is hydrogen or methyl. The second monomeric units are of Formula (II).

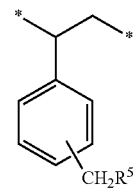

(II)

In Formula (II), group $R^5$ is a cationic, nitrogen-containing group that is free of a polymerizable group (e.g., an ethylenically unsaturated group such as a (meth)acryloyl group or vinyl group). The third monomeric units are of Formula (III-1), Formula (III-2), or a mixture thereof.

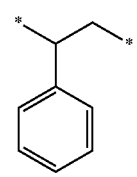

(III-1)

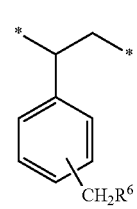

(III-2)

In Formula (III-2), group $R^6$ is halo, hydroxy, or alkoxy. Any cationic group in the copolymer has a corresponding anionic group and each asterisk (*) is a point of attachment to another group or monomeric unit in the copolymer.

In a second aspect, a crosslinked copolymer is provided. The crosslinked copolymer is the crosslinked reaction product of the crosslinkable copolymer described in the first aspect above.

In a third aspect, an anion exchange membrane is provided. The anion exchange membrane comprises the crosslinked copolymer described in the second aspect above.

In a fourth aspect, an electrochemical cell is provided. The electrochemical cell contains an anion exchange membrane comprising the crosslinked copolymer described in the second aspect above.

In a fifth aspect, a method of making a crosslinkable copolymer is provided. The method includes providing a precursor copolymer comprising monomeric units derived from styrene and monomeric units derived from vinylbenzyl chloride. The method further includes reacting the precursor copolymer with a base composition to form a crosslinkable copolymer, wherein the base composition comprises a) a first nitrogen-containing base of Formula (IV)

$$R^1R^2N—R^3—X—CO—CR^4=CH_2 \qquad (IV)$$

and b) a second nitrogen-containing base that is free of a polymerizable group.

In a sixth aspect, a method of making a crosslinked copolymer is provided. The method includes preparing a crosslinkable copolymer as described in the fifth aspect. The method further includes mixing the crosslinkable copolymer with a photoinitiator to prepare a crosslinkable composition and then exposing the crosslinkable composition to ultraviolet radiation to form the crosslinked copolymer.

DETAILED DESCRIPTION

Both a crosslinkable copolymer and a crosslinked copolymer are provided. The crosslinkable copolymer has pendant, cationic, nitrogen-containing groups with some (but not all) of these pendant groups further including a (meth)acryloyl group. The pendant, cationic, nitrogen-containing groups that further include a (meth)acryloyl group can function as crosslinking groups. The (meth)acryloyl groups can react to form a crosslinked copolymer that is ionically conductive. The resulting crosslinked copolymer can be used to provide an anion exchange membrane with improved mechanical properties compared to those that are either formed from a non-crosslinked copolymer or formed using a compound such as divinylbenzene as the crosslinking agent. The membranes can be used in electrochemical cells such as fuel cells, electrolyzers, batteries, and electrodialysis cells.

The crosslinkable copolymer is formed from a precursor copolymer. The precursor copolymer typically contains a mixture of monomeric units derived from styrene and from a vinylbenzyl halide such as vinylbenzyl chloride. At least two nitrogen-containing bases are reacted with the precursor copolymer to form the crosslinkable copolymer. The nitrogen-containing bases are selected to introduce pendant, cationic, nitrogen-containing groups into the crosslinkable copolymer. The first nitrogen-containing base includes a (meth)acryloyl group and introduces a pendant group cationic, nitrogen-containing group that is polymerizable. The second nitrogen-containing base does not have a polymerizable group such as an ethylenically unsaturated group selected from a (meth)acryloyl group or vinyl group. The selection of the amount of the first nitrogen-containing base relative to the amount of the second nitrogen-containing base can be used to control the extent of crosslinking that can occur when the crosslinkable copolymer is subjected to ultraviolet radiation in the presence of a photoinitiator.

As used herein, "a", "an", and "the" are used interchangeably and mean one or more.

The term "and/or" is used to indicate that one or both stated conditions may occur, for example A and/or B includes, (A and B) and (A or B). That is, it is used to mean A alone, B alone, or A plus B.

The term "alkyl" refers to a monovalent group that is a radical formally derived by abstraction of a hydrogen atom from an alkane. The alkyl can have at least 1, at least 2, at least 3, at least 4, at least 6, or at least 10 carbon atoms and can have up to 18 carbon atoms, up to 12 carbon atoms, up to 10 carbon atoms, up to 6 carbon atoms, or up to 4 carbon atoms. The alkyl can be linear, branched, cyclic, or a combination thereof. A linear alkyl has at least one carbon atom while a cyclic or branched alkyl has at least 3 carbon atoms. In some embodiments, if there are greater than 12 carbon atoms, the alkyl is branched. Examples of linear alkyl groups include methyl, ethyl, n-propyl, n-butyl, n-pentyl, n-hexyl, n-heptyl, and n-octyl groups. Examples of branched alkyl groups include iso-propyl, iso-butyl, sec-butyl, t-butyl, neopentyl, isopentyl, and 2,2-dimethylpropyl groups. Examples of cycloalkyl groups include cyclopropyl, cyclobutyl, cyclopentyl, and cyclohexyl.

The term "alkylene" refers to a divalent radical formally derived by abstraction of two hydrogen atoms from an alkane. The alkylene can have at least 1, at least 2, at least 3, at least 4, at least 6, or at least 10 carbon atoms and can have up to 18 carbon atoms, up to 12 carbon atoms, up to 10 carbon atoms, up to 6 carbon atoms, or up to 4 carbon atoms. The alkylene can be linear, branched, cyclic, or a combination thereof. Examples include methylene, ethylene, propylene, butylene, and cyclohexylene.

The term "copolymer" refers to a polymer formed from two or more different monomers. The copolymers are typically random. The terms "copolymer" and "polymer" can be used interchangeably herein.

The term "halo" refers to chloro, bromo, fluoro, or iodo.

The term "(hetero)alkoxy" refers to alkoxy groups or heteroalkoxy groups of formula —$OR^a$ where $R^a$ is an alkyl or a heteroalkyl. Suitable alkyl groups are the same as defined above. Heteroalkyl groups are alkyl groups in which a carbon atom positioned between two other carbon atoms is replaced with oxygen. Examples of (hetero)alkoxy groups include, but are not limited to, methoxy, ethoxy, propoxy, iso-propoxy, ethoxyethoxy, and methoxypropoxy.

The term "heterocyclic ring" refers to a ring structure having carbon atoms and at least 1 heteroatom selected from oxygen, nitrogen, or sulfur, wherein the ring structure is saturated or unsaturated. The heteroatom is often nitrogen or nitrogen plus one or more additional heteroatoms. The heterocyclic ring typically has 5 to 7 ring atoms and 1 to 3 heteroatoms. In some embodiments, the heterocyclic ring contains only nitrogen heteroatoms. Compounds with a heterocyclic ring include, but are not limited to, imidazole, pyridine, piperidine, pyrrole, pyrazole, triazole, tetrazole, pyrimidine, pyrazine, pyridazine, triazine, and piperazine. The heterocyclic ring optionally can be substituted with one or more alkyl groups.

The term "(meth)acryloyl" refers to a group of formula $CH_2=CHR^4$—(CO)— where $R^4$ is hydrogen or methyl and the group —(CO)— refers to a carbonyl group.

The term "(meth)acrylate" refers to an acrylate, a methacrylate, or both. Likewise, the term (meth)acrylamide refers to an acrylamide, methacrylamide, or both.

The terms "in a range of" or "in the range of" are used interchangeably to refer to all values within the range plus the endpoints of the range.

Precursor Copolymer

The crosslinkable copolymer is formed from a precursor copolymer. The precursor copolymer typically is a copolymer having monomeric units derived from styrene as well as monomeric units derived from vinylbenzyl halide, which is usually vinylbenzyl chloride. Other optional monomeric units can be included, if desired, in the precursor copolymer providing the final crosslinked copolymer has the desired ionic conductivity, solubility, mechanical strength, and swelling characteristics. The precursor copolymer is typically a random copolymer and is often linear.

In many embodiments, the precursor copolymer is a random copolymer formed from styrene and vinylbenzyl halide such as vinylbenzyl chloride. Such a precursor copolymer has monomeric units derived from styrene as in Formula (III-1) and monomeric units derived from vinylbenzyl halide as in Formula (III-2A) where X is a halo (e.g., the halo is often chloro).

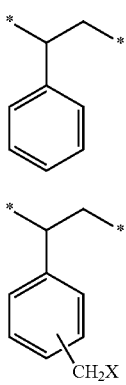

(III-1)

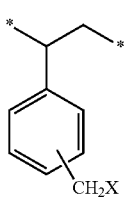

(III-2A)

The resulting precursor copolymer is usually of Formula (X).

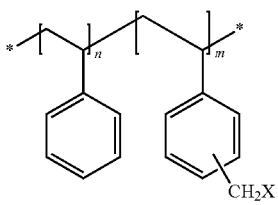

(X)

In Formula (X), the variable n is the mole percent of styrenic monomeric units and the variable m is the mole percent of vinylbenzyl halide monomeric units in the precursor copolymer. The monomeric units are typically arranged in a random manner. That is, monomeric units of the same type are not all together in a block. The asterisk (*) indicates the attachment to other groups in the copolymer such as, for example, end groups or initiator residue units.

In some embodiments of the precursor copolymer, the sum of the variables n and m is equal to 100 mole percent. That is, the precursor copolymer contains only two types of monomeric units as in Formula (X). The sum of n and m is often at least 80 mole percent, at least 85 mole percent, at least 90 mole percent, at least 95 mole percent, at least 98 mole percent, at least 99 mole percent, at least 99.5 mole percent, at least 99.8 mole percent, or at least 99.9 mole percent based on the total moles of monomeric units in the precursor copolymer.

The percent of monomeric units derived from vinylbenzyl halide in the precursor copolymer is selected to provide a suitable amount of cationic, nitrogen-containing groups in the crosslinkable copolymer. That is, the cationic, nitrogen-containing groups are introduced into the crosslinkable polymeric material by reaction of nitrogen-containing bases with the monomeric units derived from vinylbenzyl halide in the precursor copolymer. The mole percent of the monomeric units derived from vinylbenzyl halide in the precursor copolymer is often at least 20 mole percent such as, for example, in the range of 20 to 50 mole percent based on the total moles of monomeric units in the precursor copolymer. If the amount is greater than 50 mole percent, the final crosslinkable and/or crosslinked copolymer may be too soluble or swellable in water, a water-based solution, or an electrolyte such as within an electrochemical cell. If the amount is less than 20 mole percent, however, the final crosslinkable and/or crosslinked copolymer may not have sufficient ionic conductivity. The precursor copolymer usually contains at least 20 mole percent, at least 25 mole percent, at least 30 mole percent, at least 35 mole percent, at least 40 mole percent and up to 50 mole percent, up to 45 mole percent, or up to 40 mole percent monomeric units derived from vinylbenzyl halide based on the total moles of monomeric units in the precursor copolymer.

The percent of monomeric units derived from styrene in the precursor monomer is selected so that the resulting crosslinkable and/or crosslinked copolymeric material is not soluble in water, a water-based solution, or an electrolyte such as that used within an electrochemical cell. If the amount of styrene is too great, however, there may not be enough monomeric units derived from vinylbenzyl halide and the resulting crosslinkable and/or crosslinked copolymeric material may not be sufficiently ionically conductive. The precursor copolymer often contains at least 50 mole percent such as, for example, 50 to 80 mole percent monomeric units derived from styrene based on the total moles of monomeric units in the precursor copolymer. The amount is often at least 50 mole percent, at least 55 mole percent, at least 60 mole percent, at least 65 mole percent, or at least 70 mole percent and up to 80 mole percent, up to 75 mole percent, up to 70 mole percent, or up to 65 mole percent based on the total moles of monomeric units in the precursor copolymer.

In some embodiments, the precursor copolymer contains 20 to 50 mole percent monomeric units derived from vinylbenzyl halide and 50 to 80 mole percent monomeric units derived from styrene. The mole percent values are based on the total moles of monomeric units in the precursor copolymer. For example, the precursor copolymer can contain 25 to 50 mole percent monomeric units derived from vinylbenzyl halide and 50 to 75 mole percent monomeric units derived from styrene, 30 to 50 mole percent monomeric units derived from vinylbenzyl halide and 50 to 70 mole percent monomeric units derived from styrene, 25 to 45 mole percent monomeric units derived from vinylbenzyl halide and 55 to 75 mole percent monomeric units derived from styrene, 30 to 45 mole percent monomeric units derived from vinylbenzyl halide and 55 to 70 mole percent monomeric units derived from styrene, or 30 to 40 mole percent monomeric units derived from vinylbenzyl halide and 60 to 70 mole percent monomeric units derived from styrene.

The precursor copolymers are prepared by mixing the monomers with a thermal initiator. Suitable thermal initiators are often selected from azo compounds such as 2,2'-azobis(isobutyronitrile), 2,2'-azobis(2,4-dimethylpentanenitrile), and 2,2'-azobis(2-methylbutyronitrile), or from peroxides such as benzoyl peroxide and lauroyl peroxide, or from mixtures thereof.

The amount of the thermal initiator is often in a range of 0.01 to 5 weight percent based on a total weight of monomers included in the precursor reaction mixture. The amount can be at least 0.01 weight percent, at least 0.05 weight percent, at least 0.1 weight percent, at least 0.5 weight percent, at least 1 weight percent and up to 5 weight percent, up to 4 weight percent, up to 3 weight percent, up to 2 weight percent, or up to 1 weight percent. The amount of thermal initiator can be used to control the molecular weight. That is, an increase in the amount tends to result in the preparation of a lower molecular weight precursor copolymer.

The polymerization reaction to form the precursor copolymer can occur with or without organic solvent and/or water being present in the reaction mixture. That is, the solids content of the precursor reaction mixture can be up to 100 weight percent. The solids content is equal to the percentage of all components in the precursor reaction mixture that are not an organic solvent and/or water. An organic solvent refers to a non-reactive, organic, liquid component. The organic solvent can be added to lower the viscosity of the precursor reaction mixture, to allow suitable mixing of the components, and to facilitate handling of the final polymeric solution. If the solids content is too low, however, the excess organic solvent and/or water needs to be removed. This adds additional cost and time to the preparation of the precursor copolymer. The solids content is often in a range of 30 to 100 weight percent based on a total weight of the precursor reaction mixture. For example, the solids content can be at least 30 weight percent, at least 40 weight percent, at least 50 weight percent, or at least 60 weight percent and up to 100 weight percent, up to 90 weight percent, up to 80 weight percent, or up to 70 weight percent.

The organic solvent, if added to the precursor reaction mixture, is typically selected based on its ability to form a single phase with the monomers and with the resulting precursor copolymer. The organic solvent can be, for example, a ketone (e.g., acetone, methyl ethyl ketone, methyl iso-butyl ketone, and cyclohexanone), an ester such as an alkyl acetate (e.g., ethyl acetate and butyl acetate), or an aromatic hydrocarbon that optionally can be halogenated (e.g., toluene and chlorobenzene).

The molecular weight (e.g., weight average molecular weight (Mw)) of the precursor copolymer is often in a range of 20,000 to 100,000 Daltons. If the weight average molecular weight is below 20,000 Daltons, the crosslinkable and/or crosslinked copolymers may not be sufficiently robust to be used as anion exchange membranes in electrochemical cells. On the other hand, if the weight average molecular weight is greater than 100,000 Daltons, the resulting crosslinkable copolymer solutions may have a viscosity that is too high for easy processing. The weight average molecular weight can be at least 20,000 Daltons, at least 30,000 Daltons, at least 40,000 Daltons, or at least 50,000 Daltons and up to 100,000 Daltons, up to 90,000 Daltons, up to 80,000 Daltons, up to 70,000 Daltons, or up to 60,000 Daltons. For example, the weight average molecular weight can be in a range of 40,000 to 100,000 Daltons, in a range of 40,000 to 80,000 Daltons, in a range of 50,000 to 80,000 Daltons, in a range of 40,000 to 70,000 Daltons, or in a range of 50,000 to 70,000 Daltons.

Cationic Crosslinkable Copolymer

A crosslinkable copolymer having cationic groups is formed from the precursor copolymer. More specifically, the monomer units derived from benzyl halide in the precursor copolymer are reacted with at least two different nitrogen-containing bases to form a crosslinkable copolymer having pendant, cationic, nitrogen-containing groups. The first base has a nitrogen-containing group plus a (meth)acryloyl group. The second base has a nitrogen-containing group but does not contain a (meth)acryloyl group or any other group that can undergo polymerization.

The first nitrogen-containing base having a (meth)acryloyl group is typically of Formula (IV).

$$R^1R^2N\text{—}R^3\text{—}X\text{—}CO\text{—}CR^4\text{=}CH_2 \quad (IV)$$

In Formula (IV), each $R^1$ and $R^2$ is independently an alkyl group, $R^3$ is an alkylene group, X is oxy or —NR— where R is hydrogen or alkyl, and $R^4$ is hydrogen or methyl. Suitable alkyl groups for R, $R^1$, $R^2$ and suitable alkylene groups for $R^3$ often contain 1 to 10 carbon atoms, 1 to 6 carbon atoms, or 1 to 4 carbon atoms. The alkyl and alkylene groups can be linear, branched, or cyclic (depending on the number of carbon atoms).

Some examples of suitable first nitrogen-containing bases of Formula (IV) where X is oxy include, but are not limited to, 2-dimethylaminoethyl (meth)acrylate, 2-diethylaminoethyl (meth)acrylate, 3-dimethylaminopropyl (meth)acrylate, and 3-diethylaminopropyl (meth)acrylate. Examples of suitable first-nitrogen-containing bases of Formula (IV) where X is —NR— (more specifically, —NH—) include, but are not limited to, 3-dimethylaminopropyl (meth)acrylamide, 2-dimethylaminoethyl (meth)acrylamide, 3-diethylaminopropyl (meth)acrylamide, and 2-diethylaminoethyl (meth)acrylamide.

Reaction of the first nitrogen-containing base with the precursor copolymer results in the formation of first monomeric units of Formula (I) in the crosslinkable copolymer.

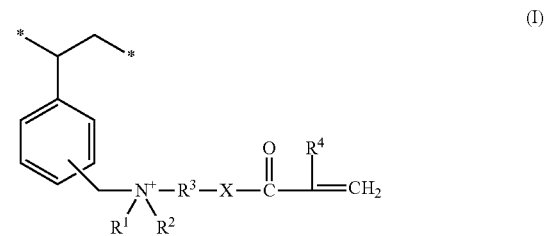

(I)

The groups $R^1$, $R^2$, $R^3$, X, and $R^4$ are the same as defined above. The nitrogen-containing pendant group —CH$_2$—(NR$^1$R$^2$)$^+$—R$^3$—X—(CO)—CR$^4$=CH$_2$ can be positioned at the ortho, meta, or para position on the benzene ring. In many embodiments, X in Formula (I) is selected to be oxy or —NH— and the first monomeric units are of Formula (I-A) or Formula (I-B), respectively.

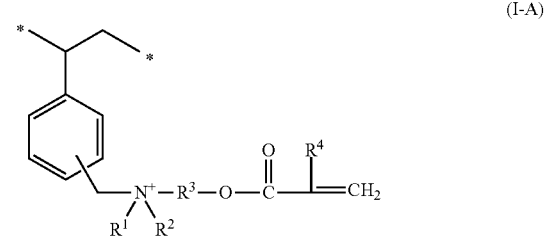

(I-A)

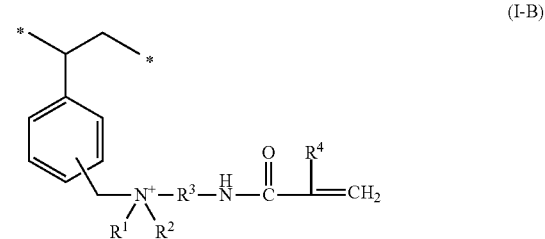

(I-B)

The second nitrogen-containing base that is reacted with the precursor copolymer is free of a polymerizable group (e.g., a (meth)acryloyl group or vinyl group) can be a) a nitrogen-containing heterocyclic compound, b) a trialkylamine compound, c) a guanidine compound substituted with multiple alkyl groups, or a mixture thereof.

In some embodiments, the second nitrogen-containing base that is free of a polymerizable group (e.g., an ethylenically unsaturated group selected from a (meth)acryloyl group and a vinyl group) can be a nitrogen-containing heterocyclic compound having a heterocyclic ring with at least one nitrogen heteroatom. The heterocyclic group can optionally include other heteroatoms other than nitrogen such as oxygen or sulfur. In most embodiments, the heterocyclic group contains either one or two nitrogen heteroatoms and no additional heteroatoms. The heterocyclic ring typically has 5 to 7 ring members (e.g., 5 or 6 ring members) and can be saturated or unsaturated (e.g., fully as in an aromatic ring or partially unsaturated). The heterocyclic ring can be unsubstituted or substituted with one or more alkyl groups.

Examples of suitable second nitrogen-containing bases that contain a heterocyclic ring include alkyl-substituted imidazole compounds. Such nitrogen-containing bases are of Formula (VI).

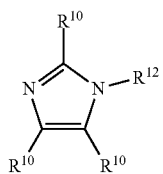

(VI)

Other examples of suitable second nitrogen-containing bases that contain a heterocyclic ring are pyridine and alkyl-substituted pyridine compounds. Such bases are of Formula (VII).

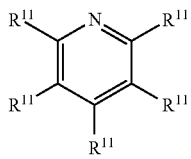

(VII)

In Formula (VI) and Formula (VII), each $R^{10}$ and $R^{11}$ is independently hydrogen or an alkyl. In Formula (VI), $R^{12}$ is an alkyl. The alkyl groups for $R^{10}$, $R^{11}$, and $R^{12}$ typically have 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples of Formula (VI) include, but are not limited to, N-methylimidazole, 1,2-dimethylimidazole, N-butylimidazole, and 1,2,4,5-tetramethylimidazole. Pyridine is a specific example of Formula (VII).

Other suitable second nitrogen-containing bases that contain a heterocyclic ring include unsaturated compounds with a five-membered ring such as pyrrole, pyrazole, triazole, and tetrazole as well as unsaturated compounds with a six-membered ring such as pyrimidine, pyrazine, pyridazine, and triazine. Saturated nitrogen-containing bases such as piperidine and piperazine can also be used. Any of these compounds can be substituted with one or more alkyl groups.

In other embodiments, the second nitrogen-containing can be a trialkyl amine compound of Formula (V).

$NR^7R^8R^9$ (V)

In Formula (V), $R^7$, $R^8$, and $R^9$ are each independently an alkyl. Suitable alkyl groups often contain 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples include, but are not limited to, trimethylamine, triethylamine, ethyldimethylamine, butyldimethylamine, and diisopropylethylamine.

In still other embodiments, the second nitrogen-containing base can be a guanidine compound that is substituted with a plurality of alkyl groups. In some embodiments, the guanidinium group is fully substituted with alkyl groups. Suitable alkyl groups often contain 1 to 10 carbon atoms, 1 to 6 carbon atoms, 1 to 4 carbon atoms, or 1 to 3 carbon atoms, and the alkyl groups can be linear, branched, or cyclic (depending on the number of carbon atoms). Examples of suitable guanidine compounds include, but are not limited to, pentamethylguanidine, 2-tert-butyl-1,1,2,2-tetramethylguanadine, and N,N-diethyl-N,N',N'-trimethylguanidine as well as cyclic and polycyclic compounds such as 2-methylimino-1,3-dimethylimidazolidine and 7-methyl-1,5,7-triazabicyclo[4.4.0]dec-5-ene.

The second nitrogen-containing bases introduce cationic, nitrogen-containing monomeric units that are free of a polymerizable group (e.g., an ethylenically unsaturated group such as a (meth)acryloyl or vinyl group) into the crosslinkable copolymer. The second nitrogen-containing bases react with the benzyl halide monomeric units to form second monomeric units are of Formula (II).

(II)

In Formula (II), group $R^5$ is a cationic, nitrogen-containing group that is free of a (meth)acryloyl group. The group —$CH_2R^5$ can be at the ortho, para, or meta position on the benzene ring. Group $R^5$ is usually a a) cationic, nitrogen-containing heterocyclic group, b) cationic trialkylamino group, or c) cationic, guanidium group that is substituted with multiple alkyl groups.

In some embodiments, the base used to form the second cationic, nitrogen-containing monomeric units are nitrogen-containing heterocyclic compounds such as, for example, those of Formula (VI) and the resulting monomeric units of Formula (II) are of Formula (IX).

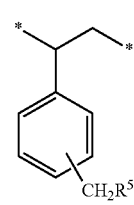

(IX)

In Formula (IX), groups $R^{10}$ and $R^{12}$ are the same as defined above for Formula (VI). That is, $R^5$ in Formula (II) is the imidazolium group as shown in Formula (IX).

In other embodiments, the base used to form the second cationic, nitrogen-containing monomeric units are nitrogen-containing heterocyclic compounds such as, for example, those of Formula (VII) and the resulting monomeric units of Formula (II) are of Formula (XI).

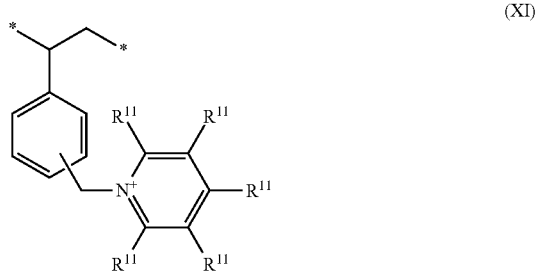

(XI)

In Formula (XI), groups $R^{11}$ is the same as described in Formula (VII).

In other embodiments, the base used to form the second cationic, nitrogen-containing monomeric units are nitrogen-containing heterocyclic compounds selected from pyrrole, pyrazole, triazole, tetrazole, pyrimidine, pyrazine, pyridazine, triazine, piperidine, and piperazine. Any of these compounds can be substituted with one or more alkyl groups.

In still other embodiments, the base used to form the second monomeric units of Formula (II) is of Formula (V) and the resulting second monomeric units are of Formula (VIII)

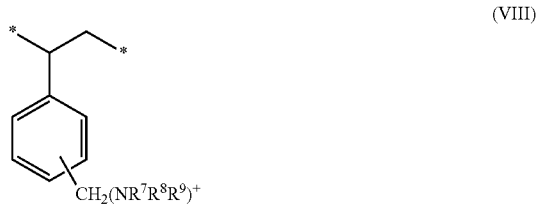

(VIII)

where $R^7$, $R^8$, and $R^9$ are defined above for Formula (V). That is, group $R^5$ in Formula (II) is a cationic, trialkylamino group, which is —$(NR^7R^8R^9)^+$, in Formula (VIII).

In yet other embodiments, the base used to form the second cationic, nitrogen-containing monomeric units are guanidine compounds that are substituted with multiple alkyl groups. Examples include, but are not limited to, pentamethylguanidine, 2-tert-butyl-1,1,2,2-tetramethylguanadine, and N,N-diethyl-N,N',N'-trimethylguanidine as well as cyclic and polycyclic compounds such as 2-methylimino-1,3-dimethylimidazolidine and 7-methyl-1,5,7-triazabicyclo[4.4.0]dec-5-ene.

The first and second nitrogen-containing bases are used to introduce pendant, cationic, nitrogen-containing groups into the crosslinkable copolymer. The first nitrogen-containing bases introduce pendant, cationic, nitrogen-containing groups that further contain (meth)acryloyl groups. The first and second nitrogen-containing bases are typically mixed together and then reacted with the precursor copolymer. More particularly, the nitrogen-containing bases react with monomeric units derived from vinylbenzyl halide in the precursor copolymer. While reacting all the available monomeric units with the nitrogen-containing base may increase the total ionic conductivity, adding more positively charged groups into the crosslinkable copolymer tends to increase its swelling and solubility in water or water-based solutions such as those used in various electrolytes within electrochemical cells. While increased ionic conductivity is desirable for use in electrochemical cells, increased swelling and solubility tends to be undesirable. The mole percent of the monomeric units derived from vinylbenzyl halide reacted is often a compromise between ionic conductivity on one hand and swelling and solubility on the other hand. Typically, the total moles of the nitrogen-containing bases are selected to react with at least 60 mole percent, at least 65 mole percent, at least 70 mole percent, at least 75 mole percent, at least 80 mole percent, at least 85 mole percent and up to 100 mole percent, up to 99 mole percent, up to 97 mole percent, up to 95 mole percent, up to 90 mole percent, up to 85 mole percent, or up to 80 mole percent of the monomeric units derived from vinylbenzyl chloride. Often, the total moles of the nitrogen-containing base are selected to be less than the moles of monomeric units derived from vinylbenzyl halide to avoid an excess of the nitrogen-containing base present in the final product solution.

When prepared for use in an electrochemical cell, the crosslinkable copolymer often contains 20 mole percent to 50 mole percent cationic, nitrogen-containing monomeric units based on the total moles of monomeric units in the crosslinkable copolymer. If lower amounts of the cationic, nitrogen-containing monomeric units are present, the resulting crosslinkable and/or crosslinked copolymer may not have sufficient ionic conductivity. If higher amounts of the cationic, nitrogen-containing monomeric units are present, however, the resulting crosslinkable and/or crosslinked copolymer may be too soluble and/or swell too much when used as an anion exchange membrane in an electrochemical cell. The crosslinkable copolymer can contain at least 20 mole percent, at least 25 mole percent, at least 30 mole percent, at least 35 mole percent, or at least 40 mole percent and up to 50 mole percent, up to 45 mole percent, up to 40 mole percent, up to 35 mole percent, or up to 30 mole percent cationic, nitrogen-containing monomeric units.

Of the cationic, nitrogen-containing monomeric units in the crosslinkable copolymer, 1 to 95 percent are of Formula (I). At least 1 percent, at least 2 percent, at least 5 percent, at least 10 percent, at least 20 percent, at least 30 percent, at least 40 percent and up to 95 percent, up to 90 percent, up to 80 percent, up to 70 percent, up to 60 percent, up to 50 percent, up to 40 percent, up to 30 percent, or up to 20 percent of the cationic, nitrogen-containing monomeric units are of Formula (I). In some embodiments, 1 to 80 percent, 1 to 60 percent, 1 to 40 percent, 1 to 30 percent, 5 to 30 percent, or 5 to 20 percent of the cationic, nitrogen-containing monomeric units in the crosslinkable copolymer are of Formula (I).

When prepared for use in an electrochemical cell, the total content of cationic, nitrogen-containing monomeric units is usually in a range of 20 to 50 mole percent of the crosslinkable copolymer. If 1 to 95 percent of the cationic, nitrogen-containing monomeric units are of Formula (I), the monomeric units of Formula (I) are in a range of 0.2 to 47.5 mole percent based on all the monomeric units in the crosslinkable copolymer. The amount of monomeric units of Formula (I) is often at least 0.2 mole percent, at least 0.5 mole percent, at least 1 mole percent, at least 2 mole percent, at least 5 mole percent, or at least 10 mole percent and up to 45 mole percent, up to 40 mole percent, up to 35 mole percent, up to 30 mole percent, up to 25 mole percent, up to 20 mole percent, up to 15 mole percent, or up to 10 mole percent of the total monomeric units present in the crosslinkable copolymer. For example, the crosslinkable copolymer can have in a range of 0.5 to 45 mole percent, 1 to 45 mole percent, 5 to 45 mole percent, 1 to 40 mole percent, 5 to 40 mole percent, 1 to 30 mole percent, 5 to 30 mole percent, 1 to 20 mole percent, or 5 to 20 mole percent of the monomeric units of Formula (I) based on the total moles of monomeric units in the crosslinkable copolymer.

The monomeric units of Formula (I) have pendant (meth)acryloyl groups that can react with other pendant (meth)acryloyl groups in the same copolymer molecule or in a different copolymer molecule when exposed to ultraviolet radiation in the presence of a photoinitiator. If the number of pendant (meth)acryloyl groups is too high, the resulting crosslinkable and/or crosslinked copolymer will have minimum swelling in water. Because ionic conductivity is at least partially related to swelling, the resulting crosslinking copolymer often is not sufficiently conductive and often will be quite brittle. On the other hand, if the number of pendant (meth)acryloyl groups is too low, the crosslink density may not be adequate and the crosslinkable copolymer may swell too much and/or may be soluble in water, a water-based solution, or an electrolyte that is used in an electrochemical cell.

Although the percent of all cationic, nitrogen-containing monomeric units in the crosslinkable copolymer of Formula (I) can be in a range of 1 to 95 percent, the amount is often in a range of 5 to 20 percent to provide a good balance of properties when the crosslinkable copolymer is prepared for use in an electrochemical cell. At least 5 percent, at least 7 percent, at least 10 percent, at least 12 percent, or at least 15 percent and up to 20 percent, up to 18 percent, up to 15 percent, up to 12 percent, or up to 10 percent of the cationic nitrogen-containing monomeric units in the crosslinkable copolymer are of Formula (I).

Stated differently, particularly when the crosslinkable copolymer is prepared for use in an electrochemical cell, the total content of cationic, nitrogen-containing monomeric units is in a range of 20 to 50 mole percent and the monomeric units of Formula (I) are in a range of 1 to 10 mole percent based on all the monomeric units in the crosslinkable copolymer. The monomeric units of Formula (I) are often at least 1 mole percent, at least 2 mole percent, at least 3 mole percent, or at least 5 mole percent and up to 10 mole percent, up to 7 mole percent, or up to 5 mole percent based on all the monomeric units in the crosslinkable copolymer.

Of the cationic, nitrogen-containing monomeric units in the crosslinkable copolymer, 5 to 99 percent are of Formula (II). At least 5 percent, at least 10 percent, at least 15 percent, at least 20 percent, at least 25 percent, at least 30 percent, at least 35 percent, at least 40 percent, at least 45 percent, or at least 50 percent and up to 99 percent, up to 97 percent, up to 95 percent, up to 90 percent, up to 80 percent, up to 70 percent, up to 60 percent, up to 50 percent, up to 40 percent, up to 30 percent, or up to 20 percent of the cationic, nitrogen-containing monomeric units are of Formula (II). In some embodiments, 5 to 95 percent, 10 to 95 percent, 15 to 95 percent, 20 to 95 percent, 30 to 95 percent, 40 to 95 percent, or 50 to 95 percent of the cationic, nitrogen-containing monomeric units in the crosslinkable copolymer are of Formula (II).

When prepared for use in an electrochemical cell, the total content of cationic, nitrogen-containing monomeric units is in a range of 20 to 50 mole percent of the crosslinkable copolymer. If 5 to 99 percent of the cationic, nitrogen-containing monomeric units are of Formula (II), the monomeric units of Formula (II) are in a range of 2.5 to 49.8 mole percent based on all the monomeric units in the crosslinkable copolymer. The crosslinkable copolymer contains at least 2.5 mole percent, at least 3 mole percent, at least 5 mole percent, at least 10 mole percent, at least 15 mole percent, at least 20 mole percent, or at least 35 mole percent and up to 49.8 mole percent, up to 49 mole percent, up to 45 mole percent, up to 40 mole percent, up to 35 mole percent, or up to 30 mole percent monomeric units of Formula (II).

Although the percent of all cationic, nitrogen-containing monomeric units in the crosslinkable copolymer of Formula (II) can be in a range of 5 to 99 percent, the amount is often in a range of 80 to 95 percent to provide a good balance of properties when the crosslinkable copolymer is prepared for use in an electrochemical cell. At least 80 percent or at least 85 percent and up to 95 percent or up to 90 percent of the cationic, nitrogen-containing groups in the crosslinkable copolymer are of Formula (II).

Stated differently, particularly when the crosslinkable copolymer is prepared for use in an electrochemical cell, the total content of cationic, nitrogen-containing monomeric units is in a range of 20 to 50 mole percent and the monomeric units of Formula (II) are in a range of 10 to 49 mole percent based on all the monomeric units in the crosslinkable copolymer. The second monomeric units of Formula (II) are often at least 10 mole percent, at least 15 mole percent, at least 20 mole percent, or at least 25 mole percent and up to 49 mole percent, up to 45 mole percent, up to 40 mole percent, or up to 35 mole percent of all the monomeric units in the crosslinkable copolymer.

In some embodiments, the crosslinkable copolymers contain 1 to 10 mole percent monomeric units of Formula (I) and 10 to 49 mole percent monomeric units of Formula (II), 2 to 10 mole percent monomeric units of Formula (I) and 10 to 48 mole percent monomeric units of Formula (II), 1 to 8 mole percent monomeric units of Formula (I) and 12 to 49 mole percent monomeric units of Formula (II), 1 to 5 mole percent monomeric units of Formula (I) and 15 to 49 mole percent monomeric units of Formula (II), and 5 to 10 mole percent monomeric units of Formula (I) and 15 to 45 mole percent monomeric units of Formula (II). The amounts are based on the total moles of monomeric units in the crosslinkable copolymer.

In addition to the first monomeric units of Formula (I) and the second monomeric units of Formula (II), the crosslinkable copolymer further contains one or more third monomeric units. The third monomeric units are selected from those of Formula (III-1), Formula (III-2), or both.

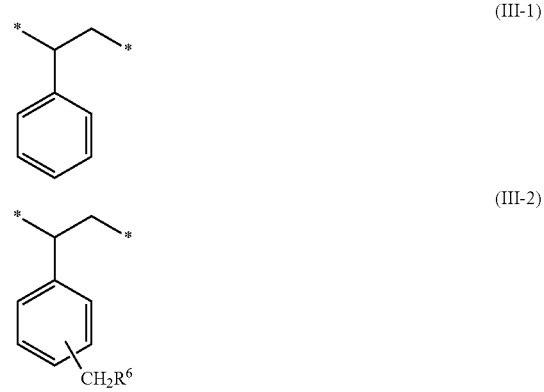

In Formula (III-2), $R^6$ is halo, hydroxy, or alkoxy. The third monomeric units of Formula (III-1) are from monomeric units derived from styrene in the precursor copolymer. The third monomeric units of Formula (III-2) are from the monomeric units derived from vinylbenzyl halide in the precursor copolymer. Monomeric units with $R^6$ equal to hydroxy or alkoxy typically result from reaction of any remaining monomeric units derived from vinylbenzyl halide with a hydroxide-containing base, an alcohol (e.g., an alcohol having 1 to 10 carbon atoms, 1 to 6, carbon atoms, or 1 to 4 carbon atoms), water, or a mixture thereof.

The total amount of third monomeric units of Formula (III-1) and/or Formula (III-2) are in a range of 50 to 80 mole percent based on the total moles of monomeric units in the crosslinkable copolymer. If the amount is greater than 80 mole percent, there may be an insufficient amount of the cationic, nitrogen-containing monomeric units in the crosslinkable and/or crosslinked copolymer. The ionic conductivity of the resulting crosslinkable and/or crosslinked copolymer may not be suitable for use in an electrochemical cell. If the amount is less than 50 mole percent, however, the crosslinkable copolymer may be too soluble and/or may swell excessively in the water, water-based solutions, or various electrolytes included in an electrochemical cell. The total amount of the third monomeric units is often at least 50 mole percent, at least 55 mole percent, at least 60 mole percent, at least 65 mole percent, or at least 70 mole percent and up to 80 mole percent, up to 75 mole percent, up to 70 mole percent, or up to 65 mole percent based on the total moles of monomeric units in the crosslinkable copolymer.

The monomeric units of Formula (III-1) are often present in an amount of 50 to 80 mole percent based on total moles of monomeric units in the crosslinkable copolymer. The monomeric units of Formula (III-1) can be adjusted to increase or decrease the number of nitrogen-containing monomeric units of Formula (I) and/or Formula (II). Increasing the number of monomeric units derived from styrene can be used to decrease solubility and/or swelling of the crosslinkable copolymer in water, water-based solutions, or various electrolytes such as those used in an electrochemical cell. If the amount of the monomeric units derived from styrene is too high, however, the resulting crosslinkable copolymer may not have sufficient ionic conductivity. The crosslinkable copolymer often contains at least 50 mole percent, at least 55 mole percent, at least 60 mole percent, at least 65 mole percent, or at least 70 mole percent and up to 80 mole percent, up to 75 mole percent, up to 70 mole percent, or up to 65 mole percent monomeric units of Formula (III-1) based on total moles of monomeric units in the crosslinkable copolymer. For example, the crosslinkable copolymer can contain 50 to 80 mole percent, 50 to 75 mole percent, 50 to 70 mole percent, 55 to 80 mole percent, 55 to 75 mole percent, 55 to 70 mole percent, 60 to 80 mole percent, 60 to 75 mole percent, or 60 to 70 mole percent monomeric units of Formula (III-1).

The crosslinkable copolymer may contain third monomeric units of Formula (III-2). These monomeric units result from monomeric units in the precursor copolymer that were derived from vinylbenzyl halide. More particularly, these monomeric units can result from the incomplete conversion of the vinylbenzyl halide monomeric units in the precursor copolymer to cationic monomeric units of Formula (I) or Formula (II) in the crosslinkable copolymer. The amount of the monomeric units of Formula (III-2) is often in a range of 0 to 20 mole percent based on total moles of monomeric units in the crosslinkable copolymer. The amount can be at least 1 mole percent, at least 2 mole percent, at least 3 mole percent, at least 5 mole percent, at least 10 mole percent and can be up to 20 mole percent, up to 15 mole percent, or up to 10 mole percent. For example, the amount can be in a range of 1 to 20 mole percent, 5 to 20 mole percent, 10 to 20 mole percent, 0 to 15 mole percent, 1 to 15 mole percent, 5 to 15 mole percent, 0 to 10 mole percent, 1 to 10 mole percent, 0 to 5 mole percent, or 1 to 5 mole percent.

In some embodiments, the crosslinkable copolymers contain 50 to 80 mole percent monomeric units of Formula (III-1) and 0 to 20 mole percent monomeric units of Formula (III-2), 50 to 80 mole percent monomeric units of Formula (III-1) and 1 to 20 mole percent monomeric units of Formula (III-2), 50 to 80 mole percent monomeric units of Formula (III-1) and 0 to 10 mole percent monomeric units of Formula (III-2), 50 to 80 mole percent monomeric units of Formula (III-1) and 1 to 10 mole percent monomeric units of Formula (III-2), 50 to 70 mole percent monomeric units of Formula (III-1) and 0 to 20 mole percent monomeric units of Formula (III-2), 50 to 70 mole percent monomeric units of Formula (III-1) and 0 to 10 mole percent monomeric units of Formula (III-2), 50 to 70 mole percent monomeric units of Formula (III-1) and 1 to 10 mole percent monomeric units of Formula (III-2), 60 to 70 mole percent monomeric units of Formula (III-1) and 0 to 20 mole percent monomeric units of Formula (III-2), 60 to 70 mole percent monomeric units of Formula (III-1) and 0 to 10 mole percent monomeric units of Formula (III-2), or 60 to 70 mole percent monomeric units of Formula (III-1) and 1 to 10 mole percent monomeric units of Formula (III-2).

Some crosslinkable copolymers contain 1 to 10 mole percent monomeric units of Formula (I), 10 to 49 mole percent monomeric units of Formula (II), 50 to 80 mole percent monomeric units of Formula (III-1), and 0 to 20 mole percent monomeric units of Formula (III-2). Other crosslinkable copolymers contain 2 to 10 mole percent monomeric units of Formula (I), 10 to 48 mole percent monomeric units of Formula (II), 50 to 80 mole percent monomeric units of Formula (III-1), and 0 to 20 mole percent monomeric units of Formula (III-2). Still other crosslinkable copolymers contain 1 to 8 mole percent monomeric units of Formula (I), 12 to 49 mole percent monomeric units of Formula (II), 50 to 80 mole percent monomeric units of Formula (III-1), and 0 to 20 mole percent monomeric units of Formula (III-2). Yet other crosslinkable copolymers contain 1 to 5 mole percent monomeric units of Formula (I), 15 to 49 mole percent monomeric units of Formula (II), 50 to 80 mole percent monomeric units of Formula (III-1), and 0 to 20 mole percent monomeric units of Formula (III-2). Even other crosslinkable copolymers contain 5 to 10 mole percent monomeric units of Formula (I), 15 to 45 mole percent monomeric units of Formula (II), 50 to 80 mole percent monomeric units of Formula (III-1), and 0 to 20 mole percent monomeric units of Formula (III-2). The amounts are based on the total moles of monomeric units in the crosslinkable copolymer.

The cationic, nitrogen-containing groups have a corresponding anion to balance the charge. The anion is often a halide (e.g., chloro, bromo, or iodo), bicarbonate, carbonate, or hydroxide.

The nitrogen-containing bases are typically added to the precursor copolymer in the presence of one or more organic solvents. Water may also be present. The solvent system is selected so that the final product (i.e., the cationic, nitrogen-containing copolymer, which is the crosslinkable copolymer) is dissolved. The solvent system may or may not dissolve the precursor copolymer. That is, the initial reaction mixture can be either a solution or a slurry. If the initial reaction mixture is a slurry, the solvent system is usually selected so that resulting crosslinkable copolymer is dissolved. Suitable solvents that can dissolve both the precursor copolymer as well as the crosslinkable copolymer include N,N-dimethylformamide, N,N-dimethylacetamide, N-methylpyrrolidinone, and dimethyl sulfoxide. Suitable solvents that can dissolve the crosslinkable copolymer but not the precursor copolymer include, but are not limited to, methanol, ethanol, 1-methoxy-2-propanol, and blends of these with toluene. The reaction mixture is often heated at an elevated temperature for at least 30 minutes, at least 1 hour, or even more. The weight percent solids are often in a range of 10 to 60 weight percent, 20 to 50 weight percent, or 20 to 40 weight percent.

The bases are often combined with the crosslinkable copolymer in the presence of an inhibitor to prevent premature reaction of the (meth)acryloyl groups. Suitable inhibitors include, for example, 4-hydroxy-2,2,6,6-tetramethylpiperidin-1-oxyl, 4-tert-butylpyrocatechol, tert-butylhydroquinone, 1,4-benzoquinone, 6-tert-butyl-2,4-xylenol, 2,6-di-tert-butyl-p-cresol, 2,6-di-tert-butylphenol, hydroquinone, 4-methoxyphenol, and phenothiazine.

The molecular weight (e.g., weight average molecular weight (Mw)) of the crosslinkable copolymer is often in a range of 25,000 to 200,000 Daltons. The weight average molecular weight can be at least 30,000 Daltons, at least 40,000 Daltons, at least 50,000 Daltons, or at least 75,000 Daltons and up to 200,000 Daltons, up to 150,000 Daltons, up to 125,000 Daltons, up to 100,000 Daltons, or up to 75,000 Daltons.

Crosslinked Copolymer

The crosslinkable copolymers can be crosslinked by reacting multiple pendant (meth)acryloyl groups in the same or different crosslinkable copolymeric molecule. The crosslinking reaction typically occurs by exposure to ultraviolet radiation in the presence of a suitable photoinitiator. That is, a crosslinkable composition is formed that includes the crosslinkable copolymer and a photoinitiator. The crosslinkable composition is exposed to ultraviolet radiation to form the crosslinked copolymer.

Suitable photoinitiators that can be added to the crosslinkable composition include compounds such as benzophenone, 4-methylbenzophenone, benzoyl benzoate, phenylacetophenones such as 2,2-dimethoxy-2-phenylacetophenone or alpha, alpha-diethoxyacetophenone, 1-hydroxycyclohexyl phenyl ketone (available under the trade designation IRGACURE 184 from BASF Corp., Florham Park, NJ), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), ethyl (2,4,6-trimethylbenzoyl) phenylphosphinate (this is also referred to as 2,4,6-trimethylbenzoylphenyl-phosphinic acid ethyl ester and as TPO-L), 2,4,6-trimethylbenzoyl-diphenylphosphine oxide (this compound is often referred to as TPO), and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

The amount of the photoinitiator in the crosslinkable composition is often in a range of 0.01 to 5 weight percent based on the weight of the crosslinkable copolymer. The amount is at least 0.01 weight percent, at least 0.05 weight percent, at least 0.1 weight percent, at least 0.2 weight percent, at least 0.5 weight percent, or at least 1 weight percent and up to 5 weight percent, up to 4 weight percent, up to 3 weight percent, up to 2 weight percent, or up to 1 weight percent.

In many embodiments, the crosslinkable composition includes the crosslinkable copolymer, the photoinitiator, and an organic solvent (such as that in which the crosslinkable copolymer was formed). The crosslinkable composition is typically a single phase.

The crosslinkable composition is often coated onto a substrate to form a coated layer that is then exposed to ultraviolet radiation. Any suitable substrate can be used. The substrate can be, for example, a polymeric material, glass, ceramic material, metal, or the like.

In some embodiments, the substrate is a release liner. The crosslinkable composition is applied to a surface of a release liner (i.e., to the release layer of the release liner) and then subjected to ultraviolet radiation. The crosslinked (i.e., cured) product, which contains the crosslinked copolymer, is a crosslinked layer that can be subsequently removed from the release liner for use. Any suitable release liner can be used.

Release liners often include a base layer that is a polymeric film. Suitable polymers for the base layer include, but are not limited to, polyesters such as polyethylene terephthalate and polycarbonate, and polyolefins such as polyethylene, polypropylene, or copolymers thereof. A release layer is adjacent to the base layer. The release layer often contains a fluorinated-based polymeric material, a siloxane-based polymeric material, or a (meth)acrylic-based polymeric material such as those described in U.S. Pat. No. 7,816,477 (Suwa).

Crosslinking occurs upon exposure of the crosslinkable composition to ultraviolet radiation and initiation of free radical-based polymerization reactions of the pendant (meth)acryloyl groups. Although any suitable form of ultraviolet light source can be used, D type bulbs are often selected. Such bulbs tend to have a significant fraction of their radiation output in a wavelength range of 350 to 400 nanometers.

Anion Exchange Membrane in Electrochemical Cells

The crosslinked copolymer can be used to form an anion exchange membrane in an electrochemical cell. When used as an anion exchange membrane, the crosslinked copolymer is often present as a crosslinked layer having a thickness in a range of 10 to 500 micrometers or greater. The thickness can be at least 10 micrometers, at least 20 micrometers, at least 30 micrometers, at least 40 micrometers, or at least 50 micrometers and up to 500 micrometers or greater, up to 400 micrometers, up to 300 micrometers, up to 200 micrometers, up to 100 micrometers, or up to 50 micrometers.

In some embodiments, the anion exchange membrane further includes a reinforcement material such as a porous support. The porous support can be a woven or non-woven material made of a polymeric material such as, for example, fluoropolymers (e.g., polytetrafluoroethylene) or polyolefins (e.g., polyethylene or polypropylene), electrospun fibers, fiberglass, polymer fibers, fiber mats, perforated films, and porous ceramics. The reinforcement material can be imbibed (e.g., saturated or coated) with a liquid composition containing the crosslinkable copolymer described herein either neat or containing solvent (e.g., dissolved in a suitable solvent), followed by crosslinking and removal of the solvent (if present) to embed the crosslinked copolymer into the pores of the reinforcement material. The porous support is generally electrically non-conductive.

The anion exchange membranes can be characterized by percent swelling. The percent swelling can be determined by the linear expansion ratio, for example, either in the chloride form or in the hydroxide form, which can be determined using the difference between wet and dry dimensions of a membrane sample (e.g., a sample measuring 3 cm in length and 1 cm in width) using equation (1):

$$SW(\%) = \frac{X_{wet} - X_{dry}}{X_{dry}} \times 100\% \quad (1)$$

where $X_{wet}$ and $X_{dry}$ are the lengths of a wet and a dry membrane, respectively.

The percent swelling depends on the anion selected to neutralize the cationic charges in the crosslinked copolymer. The percent swelling in the chloride form can be less than about 60%, less than about 50%, less than about 40%, less than about 30%, less than about 20%, less than about 10% or less than about 5%. The percent swelling in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35% or less than about 30%.

The crosslinked copolymers included in the membranes are not soluble in water or other liquid compositions included in electrochemical cells. The solubility is often less than 5 weight percent, less than 4 weight percent, less than 3 weight percent, less than 2 weight percent, less than 1 weight percent, less than 0.5 weight percent, or less than 0.1 weight percent when in contact with water for 24 hours at room temperature (e.g., 20 to 25° C.).

The anion exchange membranes typically have improved mechanical strength compared to those formed from non-crosslinked polymeric material or those formed using conventional crosslinking agents such as divinyl benzene. The improved mechanical strength is evidenced by increased stress at break (e.g., tensile strength). The improved mechanical strength results in the membranes being easier to manipulate and handle without breaking.

Further, the crosslinking is through pendant groups that are ionic (i.e., cationic). This leads to the formation of crosslinked copolymers that have improved conductivity compared to those crosslinked with a conventional crosslinking agent such as divinyl benzene. The mixing of divinyl benzene with the crosslinkable copolymer can lead to the formation of a separate poly(divinyl benzene) phase that is not ionically conductive. This separate phase can result in the formation of non-ionically conductive particles of poly (divinyl benzene) and decreased ionic conductivity of the anion exchange membrane.

The anion exchange membranes can be placed between two electrodes, the anode and cathode, of an electrochemical device. The electrochemical device often further includes catalyst layers that can be coated and/or laminated on either one or both gas diffusion layers or on one or both sides of the anion exchange membrane. An anion exchange membrane with at least one laminated and/or coated catalyst layer can be referred to as a catalyst coated membrane (CCM). In some embodiments, each electrode is a gas diffusion electrode comprising a gas diffusion layer coated with a catalyst. Gas diffusion layers are known in the art and include for example carbon paper or cloth, or a metal mesh. In other embodiments, one or both sides of the anion exchange membrane can be laminated to catalyst layer.

Examples of electrochemical devices include, but are not limited to, fuel cells, electrolyzers, batteries, or electrodialysis cells.

Electrode materials can include, for example, graphitic carbon, glassy carbon, titanium, or any of the following "catalytically active elements": V, Cr, Mn, Fe, Co, Ni, Cu, Zn, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the cathode of the electrochemical device comprises a catalytically active species comprising silver, gold, copper, nickel, iron, or combinations thereof.

In one embodiment, the anode of the electrochemical device comprises a catalytically active species comprising ruthenium, iridium, platinum, titanium, nickel, iron, cobalt, or combinations thereof.

In one embodiment, the electrochemical device is substantially free of platinum, meaning the electrode comprises less than 0.1 weight percent, less than 0.01 weight percent or even less than 0.001 weight percent platinum based on the total weight of the electrode.

The cathode, the anode, the catalysts, and the anion exchange membranes can be assembled each as a separate component or can be fabricated wherein the anion exchange membrane (or a portion thereof) is fabricated with one or both electrodes or a portion thereof. For example, to maximize cost savings and in some instances performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The assembly can include the anion exchange membrane and at least one catalyst layer and/or at least one electrode layer. One example assembly includes an anion exchange membrane laminated to a first catalyst layer on a first side and/or laminated to a second catalyst layer on a second side opposite the first side. Other example assembly layers include an anode gas diffusion layer, an anode catalyst, an anion exchange membrane, a cathode catalyst, and a cathode gas diffusion layer. Still other example assembly layers include an anode, an anion exchange membrane, and a cathode.

An assembly comprising the anode, cathode and anion exchange membranes can be sandwiched between two flow field plates and then held together such that each layer is in contact, preferably intimate contact with the adjacent layers.

Embodiments

Various embodiments are provided that include a crosslinkable copolymer having pendant cationic, nitrogen-containing groups, a crosslinked copolymer formed from the crosslinkable copolymer, an anion exchange membrane containing the crosslinked copolymer, and an electrochemical cell containing the anion exchange membrane. Methods of making the crosslinkable copolymer and crosslinked copolymer are also provided.

Embodiment 1A is a crosslinkable copolymer. The crosslinkable copolymer material contains a) first monomeric units, b) second monomeric units, and c) third monomeric units. The first monomeric units are of Formula (I).

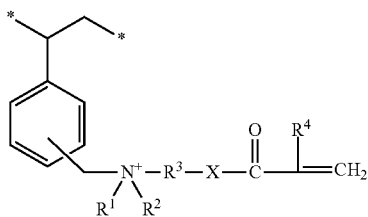

In Formula (I), group $R^1$ is an alkyl, $R^2$ is an alkyl, $R^3$ is an alkylene, X is oxy or —NR— where R is hydrogen or alkyl, and $R^4$ is hydrogen or methyl. The second monomeric units are of Formula (II).

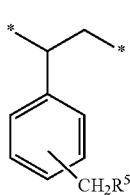

In Formula (II), group $R^5$ is a cationic, nitrogen-containing group free of a polymerizable group (e.g., an ethylenically unsaturated group such as a (meth)acryloyl group or vinyl group). The group —$CH_2R^5$ can be at the ortho, para, or meta position. The third monomeric units are of Formula (III-1), Formula (III-2), or a mixture thereof.

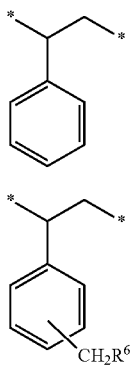

In Formula (III-2), group $R^6$ is halo, hydroxy, or alkoxy. Any cationic group in the copolymer has a corresponding anionic group and each asterisk (*) is the point of attachment to another group or monomeric unit in the copolymer.

Embodiment 2A is the crosslinkable copolymer of Embodiment 1A, wherein $R^5$ of the second monomeric units is a cationic, nitrogen-containing heterocyclic group.

Embodiment 3A is the crosslinkable copolymer of Embodiment 2A, wherein the cationic, nitrogen-containing heterocyclic group is imidazolium substituted with one or more alkyl groups, pyridinium, or pyridinium substituted with one or more alkyl groups.

Embodiment 4A is the crosslinkable copolymer of any one of Embodiments 1A to 3A, wherein the second monomeric units of Formula (II) are a reaction product of a vinylbenzyl chloride monomeric unit and a nitrogen-containing heterocyclic compound that is an alkyl substituted imidazole.

Embodiment 5A is the crosslinkable copolymer of Embodiment 1A, wherein $R^5$ of the second monomeric units is a group of formula —$(NR^7R^8R^9)^+$ where $R^7$, $R^8$, and $R^9$ are each independently an alkyl.

Embodiment 6A is the crosslinkable copolymer of Embodiment 1A, wherein $R^5$ of the second monomeric unit is a cationic guanidium group substituted with multiple alkyl groups.

Embodiment 7A is the crosslinkable copolymer of any one of Embodiments 1A to 6A, wherein the third monomeric units are a mixture of monomeric units of Formula (III-1) and Formula (III-2).

Embodiment 8A is the crosslinkable copolymer of any one of Embodiments 1A to 7A, wherein the first monomeric unit of Formula (I) is of Formula (I-A).

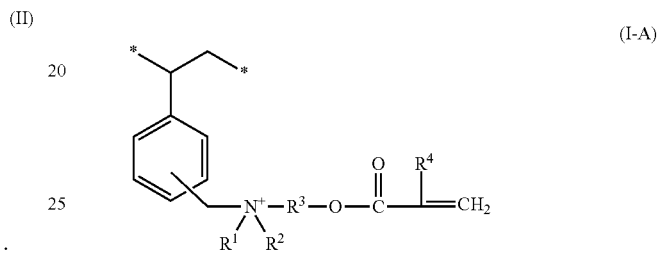

Embodiment 9A is the crosslinkable copolymer of any one of Embodiments 1A to 7A, wherein the first monomeric units of Formula (I) is of Formula (I-B).

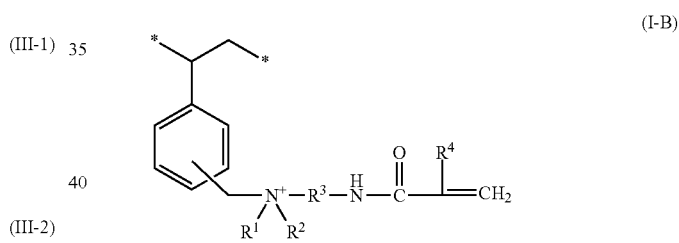

Embodiment 10A is the crosslinkable copolymer of any one of Embodiments 1A to 9A, wherein at least 20 mole percent of the monomeric units in the copolymer are cationic monomeric units of Formula (I) and Formula (II).

Embodiment 11A is the crosslinkable copolymer of any one of Embodiments 1A to 10A, wherein 20 to 50 mole percent of the monomeric units in the copolymer are cationic monomeric units of Formula (I) and Formula (II).

Embodiment 12A is the crosslinkable copolymer of Embodiment 11A, wherein 1 to 95 percent of the cationic monomeric units are of Formula (I).

Embodiment 13A is the crosslinkable copolymer of Embodiment 11A or 12A, wherein 5 to 20 percent of the cationic monomeric units are of Formula (I).

Embodiment 14A is the crosslinkable copolymer of any one of Embodiments 1A to 11A, wherein 25 to 40 mole percent of the monomeric units of the copolymer are cationic monomeric units of Formula (I) and Formula (II).

Embodiment 15A is the crosslinkable copolymer of Embodiment 14A, wherein 5 to 20 percent of the cationic monomeric units are of Formula (I).

Embodiment 16A is the crosslinkable copolymer of any one of Embodiments 1A to 11A, wherein 20 to 40 mole percent of the monomeric units in the copolymer are cationic monomeric units of Formula (I) and Formula (II).

Embodiment 17A is the crosslinkable copolymer of Embodiment 16A, wherein 5 to 20 percent of the cationic monomeric units are of Formula (I).

Embodiment 18A is the crosslinkable copolymer of any one of Embodiments 1A to 17A, wherein the copolymer comprises at least 50 mole percent third monomeric units of Formula (III-1), Formula (III-2), or mixtures thereof.

Embodiment 19A is the crosslinkable copolymer of any one of Embodiments 1A to 18A, wherein the copolymer comprises 50 to 80 mole percent third monomeric units of Formula (III-1), Formula (III-2), or mixtures thereof.

Embodiment 20A is the crosslinkable copolymer of Embodiment 19A, wherein greater than 50 percent of the third monomeric units are of Formula (III-1).

Embodiment 21A is the crosslinkable copolymer of Embodiment 20A, wherein 55 to 70 percent of the third monomeric units are of Formula (III-1) and 30 to 45 percent of the third monomeric units are of Formula (III-2).

Embodiment 22A is the crosslinkable copolymer of any one of Embodiments 1A to 21A, wherein the crosslinkable copolymer comprises 1 to 10 mole percent monomeric units of Formula (I), 10 to 49 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

Embodiment 23A is the crosslinkable copolymer of any one of Embodiments 1A to 22A, wherein the crosslinkable copolymer comprises 2 to 10 mole percent monomeric units of Formula (I), 10 to 48 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

Embodiment 24A is the crosslinkable copolymer of any one of Embodiments 1A to 22A, wherein the crosslinkable copolymer comprises 1 to 8 mole percent monomeric units of Formula (I), 12 to 49 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

Embodiment 25A is the crosslinkable copolymer of any one of Embodiments 1A to 22A, wherein the crosslinkable copolymer comprises 1 to 5 mole percent monomeric units of Formula (I), 15 to 49 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

Embodiment 26A is the crosslinkable copolymer of any one of Embodiments 1A to 22A, wherein the crosslinkable copolymer comprises 5 to 10 mole percent monomeric units of Formula (I), 15 to 45 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

Embodiment 1B is a crosslinked copolymer comprising a crosslinked reaction product of the crosslinkable copolymer of Embodiment 1A.

Embodiment 2B is the crosslinked copolymer of Embodiment 1B, wherein the crosslinkable copolymer is any one of Embodiments 2A to 26A.

Embodiment 3B is the crosslinked copolymer of Embodiment 1B or 2B, wherein the crosslinked copolymer is not soluble in water, a water-based solution, or an electrolyte for an electrochemical cell.

Embodiment 1C is an anion exchange membrane, wherein the anion exchange membrane comprises the crosslinked copolymer of Embodiment 1B.

Embodiment 2C is the anion exchange membrane of Embodiment 1C, wherein the crosslinked copolymer is of Embodiment 2B.

Embodiment 3C is the anion exchange membrane of Embodiment 1C or 2C, wherein the anion exchange membrane further comprises a reinforcement material.

Embodiment 4C is the anion exchange membrane of any one of Embodiments 1C to 3C, further comprising a catalyst layer adjacent to a first major surface and/or a second major surface of the anion exchange membrane.

Embodiment 1D is an electrochemical cell comprising an anode, a cathode, and an anion exchange membrane positioned between the anode and the cathode, wherein the anion exchange membrane is of Embodiment 1C.

Embodiment 2D is the electrochemical cell of Embodiment 1D, wherein the anion exchange membrane is of any one of Embodiments 2C to 4C.

Embodiment 3D is the electrochemical cell of Embodiment 1D or 2D, wherein the electrochemical cell further comprises a first catalyst layer and/or a second catalyst layer.

Embodiment 4D is the electrochemical cell of Embodiment 3D, wherein the first catalyst and/or second catalyst is laminated to the anion exchange membrane.

Embodiment 5D is the electrochemical cell of Embodiment 3D, wherein the anode and the cathode are each gas diffusion electrodes and wherein the gas diffusion electrode comprises a gas diffusion layer coated with a catalyst.

Embodiment 1E is a method of making a crosslinkable copolymer. The method includes providing a precursor copolymer comprising monomeric units derived from styrene and monomeric units derived from vinylbenzyl chloride. The method further includes mixing the precursor copolymer with a base composition to form a crosslinkable copolymer, wherein the base composition comprises a) a first nitrogen-containing based of Formula (IV)

$$R^1R^2N-R^3-X-CO-CR^4=CH_2 \quad (IV)$$

and b) a second nitrogen-containing base that is free of a polymerizable group (e.g., an ethylenically unsaturated group such as a (meth)acryloyl group or vinyl group).

Embodiment 2E is the method of embodiment 1E, wherein the second nitrogen-containing base comprises 1) a nitrogen-containing heterocyclic compound, 2) a trialkyl amine compound, or 3) a guanidine compound substituted with multiple alkyl groups.

Embodiment 3E is the method of Embodiment 1E or 2E, wherein the precursor copolymer is of Formula (X)

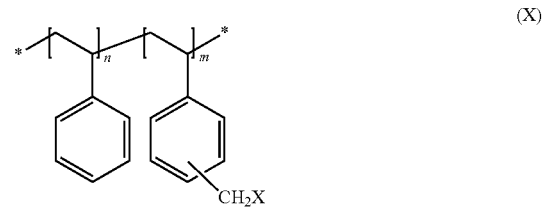

wherein n refers to the mole percent of monomeric units derived from styrene and m refers to the mole percent of monomeric units derived from vinylbenzyl halide. The sum n+m is in a range of 80 to 100 mole percent.

Embodiment 4E is the method of any one of Embodiments 1E to 3E, wherein the precursor copolymer has a weight average molecular weight in a range of 20,000 to 100,000 Daltons.

Embodiment 5E is the method of any one of Embodiments 1E to 4E, wherein the crosslinkable copolymer is any one of Embodiment 1A to 26A.

Embodiment 6E is the method of any one of Embodiments 1E to 5E, wherein the amount of base in the base composition is equal to 0.80 to 0.95 equivalents of the moles of monomeric units derived from vinylbenzyl chloride in the precursor copolymer.

Embodiment 1F is a method of making a crosslinked copolymer. The method includes preparing a crosslinkable copolymer according to Embodiment 1E. The method further includes mixing the crosslinkable copolymer with a photoinitiator to form a crosslinkable composition and then exposing the crosslinkable composition to ultraviolet radiation.

Embodiment 2F is the method of Embodiment 1F, wherein the crosslinkable copolymer is any one of Embodiments 1A to 26A.

EXAMPLES

TABLE 1

Materials

| Material | Abbreviation | Source |
|---|---|---|
| Tetramethylimidazole | TMIM | Available from TCI America (Portland, OR, USA) |
| 2-Diethylaminoethyl methacrylate | 2DEAEM | Available from TCI America (Portland, OR, USA) |
| 3-Dimethylaminopropyl methacrylamide | 3DMAPMA | Available as from TCI America (Portland, OR) |
| 2-Dimethylaminoethyl methacrylamide | 2DMAEMA | Available as from ABCR (Karlsruhe, Germany) |
| Polyvinylbenzyl chloride | PVBC | Available from Sigma Aldrich (Milwaukee, WI, USA) |
| Methoxypropanol | MP | Available from Alfa Aesar (Ward Hill, MA, USA) |
| 4-hydroxy-2,2,6,6-tetramethyl-piperidin-1-oxyl | (4-hydroxy-TEMPO) | Available under the trade designation PROSTAB from Evonik (Marl, Germany) |
| 2,4,6-Trimethylbenzoylphenyl-phosphinic acid ethyl ester | TPO-L | Available under the trade designation TPO-L from BASF (Florham Park, NJ, USA) |
| 1N Potassium hydroxide solution with less than 1 ppm metals | KOH | Available from VWR (Radnor, PA, USA) under the trade designations J. T. BAKER and BAKER ANALYZED REAGENT |
| Styrene | St | Available from Sigma Aldrich (Milwaukee, WI, USA) |
| Vinylbenzyl chloride | VBC | Available from Dow Chemical (Midland, MI, USA) as a mixture of isomers |
| Chlorobenzene | — | Available from Alfa Aesar (Ward Hill, MA, USA) |
| Azobis (isobutyronitrile) | AIBN | An initiator available from Sigma-Aldrich (Milwaukee, WI, USA) |
| Methanol | MeOH | Available from J. T. Baker Avantor Performance Materials (Center Valley, PA, USA) |
| Deuterated chloroform | $CDCl_3$ | Available from Cambridge Isotope Laboratories, Inc. (Andover, MA, USA) |
| Deuterated acetonitrile | $CD_3CN$ | Available from Cambridge Isotope Laboratories, Inc. (Andover, MA, USA) |
| Divinylbenzene | DVB | 80% technical grade, available from Sigma Aldrich (Milwaukee, WI) |

Testing Methods

Nuclear Magnetic Resonance (NMR)

An aliquot of a few drops of the copolymer solution (Copolymers 1A, 1B, and 2-7) was removed via glass pipette and transferred into a small glass vial, and the product was precipitated into ethyl acetate. The resulting white solid was washed with ethyl acetate (3×2 mL) and dried in a solvent oven (90° C., 3 hours). NMR samples were analyzed as solutions in $d_3$-acetonitrile unless otherwise stated.

NMR spectroscopy was conducted using a Bruker AVANCE III 500 MHz NMR spectrometer equipped with a CPBBO gradient cryoprobe, a Bruker B-ACS 60 autosampler, and Bruker TOPSPIN 3.04 software. Quantitative proton NMR spectra were recorded with a 15° $^1$H excitation pulse and acquisition time of 4 seconds. Spectra were analyzed using Advanced Chemistry Development software (Toronto, Canada). Analysis of the integrals in the spectra gave measured composition vs. target composition for the St/VBC copolymers and for the crosslinkable polymers (1A-11). For the crosslinkable copolymers (1A-11), analysis of integrals also generated mole % value of the conversion of chloromethyl groups to ionomeric (nitrogen cation) groups, and an ion exchange capacity (IEC) value (mmol nitrogen cation/gram crosslinkable copolymer) (Table 2).

Gel Permeation Chromatography (GPC)

Styrene/vinylbenzyl chloride copolymer samples were analyzed by GPC with light scattering detection (GPC/LS) to measure absolute or standardless molecular weights. A NIST polystyrene standard was used as a reference (broad molecular mass distribution, certified Mw=2.85E+05 g/mol±0.23E+05 g/mol, vs. measured Mw=2.53E+05 g/mol±0.15E+05 g/mol). Submitted samples were prepared singly and injected in duplicate. Solutions of known concentration (target 2-5 mg/mL) were prepared in tetrahydrofuran (THF, stabilized with 250 ppm BHT) in glass scintillation vials. The vials were swirled for at least 4 hours to allow dissolution. The solutions were filtered through 0.45 micron PTFE syringe filters and analyzed by GPC. An Agilent (Santa Clara, CA, USA) 1260 LC instrument was used with a Waters STYRAGEL HR 5E, 300×7.8 mm I.D at 40° C. A Wyatt Technology Corporation (Goleta, CA, USA) DAWN HELEOS-II 18 angle Light Scattering detector and a Wyatt Technology Corporation OPTILAB T-rEX Differential Refractive Index (DRI) detector were used. ASTRA 6 from Wyatt Technology Corporation was used for data collection and analysis.

Zeta Sizing Technique

Particle size for a colloid was measured using a Zetasizer Nano-S (Malvern Instruments, Inc., Westborough, MA). One drop of sample solution (approximately 33 weight percent solids) was added to a glass cuvette (type PCS1115) containing 3 mL 60/40 ethanol-toluene. Three measurements were taken at 20° C., with 60 second equilibrium time, and refractive index set to 1.615.

Tensile Properties of Membranes

The tensile stress-strain behavior of membranes was examined at a constant strain rate of 2 mm/second. Samples were soaked in aqueous 1M KOH solution for 24 hours at room temperature, thoroughly washed with deionized water, cut into 1.00 cm×4.00 cm strips, and tested in a fully hydrated state using a TA.XTPlus Texture Analyzer (Texture Technologies, Hamilton, MA).

Ionic Conductivity of Membranes

Ionic conductivity was measured using a 4-probe Bekk-Tech BT-110 conductivity clamp (Scribner Associates, Inc., Southern Pines, NC) and a VMP3 Multi-channel potentiostat (Bio-Logic Science Instruments, Seyssinet-Pariset, France). A dry membrane sample in the chloride form (1.40 cm×4.00 cm) was assembled under two platinum wires, and the clamp was immersed into 18 megaohms deionized water for 2 hours before measurement to hydrate and swell the membrane. A current-voltage curve was recorded by applying a linear voltage sweep from an open circuit voltage (OCV) to 0.3 V first, then to −0.3 V, and finally back to OCV at 10 mV/second scan rate. Ionic conductivity was calculated from the slope of the resulting current-voltage curve using the measured dry membrane size and thickness, and an ionic conductivity clamp constant of 0.425 cm.

Copolymer Preparation

Preparation of Styrene/Vinylbenzyl Chloride Precursor Copolymers

A 1-liter amber glass screw top bottle was charged with 170 grams styrene (used as provided without inhibitor removal), 141.2 grams vinylbenzyl chloride (used as provided without inhibitor removal), 244.4 g chlorobenzene, and 2.92 g AIBN. The styrene/vinylbenzyl chloride molar ratio was 64/36. The mixture was shaken to dissolve the initiator (AIBN) and then sparged for 4 minutes under a nitrogen stream. The bottle was capped and placed in an agitated water bath at 60° C. for 24 hours. This gave a clear, viscous polymer solution. Proton NMR analysis of the product solution in $CDCl_3$, after correction for chlorobenzene absorptions, indicated that the residual monomer content (styrene and vinylbenzyl chloride) was 22.5 mole percent.

The product solution (530.7 grams) was poured into 2.5 liters of methanol in a 4-liter beaker under mechanical stirring. Stirring was continued for several hours to break up the solid mass, then the precipitate was settled, and the solvent layer was drawn off. A fresh 2.5 liter portion of methanol was added and stirring was resumed. This sequence was continued for a total of four methanol washes. The resulting white solid was dried at room temperature in air, yielding 232.8 grams of the precursor copolymer. The solid was treated in a blender to break down the remaining chunks and to produce a uniform fine powder.

Proton NMR analysis of the precursor copolymer in $CDCl_3$ showed that the styrene/vinylbenzyl chloride mole ratio was 62/38 and that the residual monomer content was 0.9 mole percent. GPC analysis in THF showed that the number average molecular weight ($M_n$) was equal to 57,000 Daltons and that the polydispersity was 1.39. Precursor copolymers with other St/VBC ratios were prepared using the same method. All the precursor copolymers had a number average molecular weight in a range of 55,000 to 60,000 Daltons.

Preparation of Comparative Copolymer 1A in Methoxypropanol

A 250 ml 3NRB (three necked round bottom) flask was equipped with magnetic stirring, oil bath heating, and a water-cooled reflux condenser. The flask was charged with 68.3 grams methoxypropanol. With vigorous stirring (500 revolutions per minute, rpm), the flask was immersed in the oil bath at 71° C., and 25.0 grams of the styrene/vinylbenzyl chloride copolymer (Mw is equal to 60,000 Daltons and with a St/VBC molar ratio of 62/38) was added all at once while stirring was continued. 8.26 grams tetramethylimidazole (corresponding to a mole ratio of TMIm/VBC equal to 0.85) was added in a single charge, and after 5 minutes of stirring, 1.0 grams divinylbenzene and approximately 0.01 grams AIBN were added. The flask was stoppered and left to heat and stir under a nitrogen atmosphere. The undissolved polymer phase formed a ball that broke up when the stirring rate was increased to 450 rpm. All solids dissolved within 85 minutes to leave a clear solution. The stirring rate was decreased to 260 rpm and the reaction mixture was left to heat and stir for 48 hours. After 24 hours at 71-75° C., the reaction mixture had turned hazy with a translucent colloidal appearance that persisted through the remaining 24 hours of heating. The reaction mixture was cooled and then transferred into a 250 ml glass screw top jar to give 96.6 grams of recovered product dispersion.

NMR analysis showed a composition of 62 mol % (mole percent) styrene, 29 mol % vinylbenzyl imidazolium, and 9 mol % vinylbenzyl chloride.

Preparation of Comparative Copolymer 1B in Ethanol-Toluene

A 250 ml 3NRB flask was equipped with magnetic stirring, oil bath heating, and a water-cooled reflux condenser. The flask was charged with 25.0 grams of the styrene/vinylbenzyl chloride copolymer (Mw equal to 60,000 Daltons with a St/VBC molar ratio of 62/38), 8.66 grams tetramethylimidaole (corresponding to a molar ratio of TMIm/VBC equal to 0.90), 79 grams 60/40 (w/w) ethanol/toluene (200 proof ethanol) (targeting approximately 30 weight percent solids), 1 gram divinylbenzene, and 1 gram of a 1 weight percent solution of AIBN in 60/40 ethanol/toluene. Stirring at 500 rpm, the reaction mixture was sparged with nitrogen for 2 minutes and then the flask was transferred into the oil bath at 73° C. while stirring at 450 rpm. After 13 minutes, the oil bath temperature had dropped to 71° C. and the reaction mixture had separated into two liquid phases. It remained this way until it coalesced into a single translucent bluish colloidal phase after 2.5 hours. The mixture was heated at 74° C. for 3 hours, at 55° C. for 71 hours, and at 70° C. for 20 hours; the mixture retained its earlier translucent colloidal appearance.

NMR analysis showed a composition of 61 mol % styrene, 23 mol % vinylbenzylimidazolium, and 16 mol % vinylbenzyl chloride. Zeta sizing analysis showed a bimodal distribution of particles at 80 nanometers and at 500-600 nanometers diameter.

Preparation of Crosslinkable Copolymers 2 to 6

A 250 ml 3NRB flask equipped with magnetic stirring, heating mantle, thermocouple, and inlet for nitrogen blanketing was charged with 10 grams of the styrene/vinylbenzyl chloride copolymer (Mn 55,000 to 60,000 Daltons with polydispersity 1.3 formed from 62-64 mol % styrene and 36-38 mol % VBC), a mixture of tetramethylimidazole and 2-diethylaminoethyl methacrylate (a total of 0.026 moles base (0.85 equivalents) using the base ratios as in Table 2), 1-methoxy-2-propanol (26.8 grams), and 4-hydroxy-2,2,6, 6-tetramethylpiperidin-1-oxyl (1 drop aqueous solution).

The total moles of base added is equal to 85 percent of the moles of vinylbenzyl chloride monomeric units in the copolymer. The mixture was stirred at 70° C. for 48 hours, resulting in a pale-yellow solution.

Preparation of Crosslinkable Copolymer 7

A 250 ml 3NRB flask equipped with magnetic stirring, heating mantle, thermocouple, and inlet for nitrogen blanketing was charged with 10 grams styrene/vinylbenzyl chloride copolymer (St/VBC molar ratio of 51/49 with Mn approximately 60,000 Daltons), tetramethylimidazole (3.35 grams, 0.027 mol, 0.84 equivalents) and 2-diethylaminoethyl methacrylate (0.96 grams, 5.2 mmol, 0.16 equivalents), 1-methoxy-2-propanol (26.8 grams), and 4-hydroxy-2,2,6,6-tetramethylpiperidin-1-oxyl (1 drop aqueous solution). The mixture was stirred at 70° C. for 48 hours, resulting in a pale-yellow solution.

Preparation of Crosslinkable Copolymer 8

A 250 ml 3NRB flask equipped with magnetic stirring, heating mantle, thermocouple, and inlet for nitrogen blanketing was charged with 10 grams styrene/vinylbenzyl chloride copolymer (St/VBC molar ratio of 31/69 with Mn approximately 60,000 Daltons), tetramethylimidazole (3.65 grams, 0.0296 mol, 0.66 equivalents) and 2-diethylaminoethyl methacrylate (2.88 grams, 0.0155 mol, 0.34 equivalents), 1-methoxy-2-propanol (26.8 grams), and 4-hydroxy-2,2,6,6-tetramethylpiperidin-1-oxyl (1 drop aqueous solution). The mixture was stirred at 70° C. for 48 hours, resulting in a pale-yellow solution.

Preparation of Crosslinkable Polymer 9

A 250 ml 3NRB flask equipped with magnetic stirring, heating mantle, thermocouple, and inlet for nitrogen blanketing was charged with 10 grams polyvinylbenzylchloride (100 mol % VBC, $M_n$ 55,000 Daltons), a mixture of tetramethylimidazole (6.26 grams) and 2-diethylaminoethyl methacrylate (0.96 grams), 1-methoxy-2-propanol (26.8 grams), and 4-hydroxy-2,2,6,6-tetramethyipiperidin-1-oxyl (1 drop aqueous solution). The mixture was stirred at 70° C. for 48 hours, resulting in a viscous pale-yellow solution.

Preparation of Crosslinkable Polymer 10

A 250 ml 3NRB flask equipped with magnetic stirring, heating mantle, thermocouple, and inlet for nitrogen blanketing was charged with 10 grams styrene/vinylbenzylchloride copolymer (Mn 55,000 to 60,000 Daltons with polydispersity 1.3 formed from 62-64 mol % styrene and 36-38 mol % VBC), tetramethylimidazole (2.55 g, 20.6 mmol) and N-(3-dimethylaminopropyl methacrylamide (3DMAPMA) (0.88 g, 5.14 mmol) to a total of 0.85 equiv. base to 1 equiv. VBC, 1-methoxy-2-propanol (26.8 g), and 4-hydroxy-2,2,6,6-tetramethylpiperidin-1-oxyl (1 drop aqueous solution). The mixture was stirred at 70° C. for 48 hrs, resulting in a pale yellow solution.

Preparation of Crosslinkable Polymer 11

A 250 ml 3NRB flask equipped with magnetic stirring, heating mantel, thermocouple, and inlet for nitrogen blanketing was charged with 10 grams styrene/vinylbenzylchloride copolymer (Mn 55,000 to 60,000 Daltons with polydispersity 1.3 formed from 62-64 mol % styrene and 36-38 mol % VBC), a mixture of tetramethylimidazole (2.55 g, 20.6 mmol) and N-(2-dimethylaminoethyl methacrylamide (3DMAEMA) (0.80 g, 5.14 mmol) to a total of 0.85 equiv. base to 1 equiv. VBC, 1-methoxy-2-propanol (26.8 g), and 4-hydroxy-2,2,6,6-tetramethylpiperidin-1-oxyl (1 drop aqueous solution). The mixture was stirred at 70° C. for 48 hrs, resulting in a pale yellow solution.

Membrane Preparation: Examples and Comparative Examples

Membranes (Table 2) were prepared by coating 30-33 weight percent solids crosslinkable copolymer solutions prepared in Examples 1-5 on a release liner with a polyethylene terephthalate backing coated with an acrylic-based release layer as described in U.S. Pat. No. 7,816,477 (Suwa et al.). Membranes were coated using a BYK BYKO-drive automatic applicator (Gardco) at a speed setting of 1 inch/sec (2.54 cm/sec) and with a notch bar applicator having a 10 mil (0.01 inch, 0.254 mm) gap, and then dried in a forced air oven at 80° C. for 30 minutes. Measured dry coating thicknesses were in the range of 45-52 microns.

In Table 2, the measured composition is determined using NMR. Conversion refers to the percentage of monomeric VBC reacted with the base(s).

TABLE 2

Composition of copolymers and membranes

| Copolymer | Target composition (mol % base) | Measured composition (mol % base) | Conversion | IEC (mmol/g) | Membrane | Cure |
|---|---|---|---|---|---|---|
| 1A (Comparative) | 100% TMIM 0% 2DEAEM | 100% TMIM 0% 2DEAEM | 76% | 1.77 | C1 | No UV-DVB added |
| 2 | 95% TMIM 5% 2DEAEM | 94% TMIM 6% 2DEAEM | 84% | 1.95 | E1 | UV |
| 3 | 92% TMIM 8% 2DEAEM | 92% TMIM 8% 2DEAEM | 71% | 1.95 | E2 | UV |
| 4 | 90% TMIM 10% 2DEAEM | 84% TMIM 16% 2DEAEM | 78% | 1.94 | C2 E3 | No UV UV |
| 5 | 80% TMIM 20% 2DEAEM | 80% TMIM 20% 2DEAEM | 71% | 1.92 | C3 E4 | No UV UV |
| 6 (Comparative) | 0% TMIM 100% 2DEAEM | 0% TMIM 100% 2DEAEM | 78% | 1.76 | C4 | UV |

TABLE 2-continued

Composition of copolymers and membranes

| Copolymer | Target composition (mol % base) | Measured composition (mol % base) | Conversion | IEC (mmol/g) | Membrane | Cure |
|---|---|---|---|---|---|---|
| 10 | 80% TMIM 20% 3DMAPMA | 80% TMIM 20% 3DMAPMA | 86 | 1.91 | C5 E5 | No UV UV |
| 11 | 80% TMIM 20% 2DMAEMA | 84% TMIM 16% 3DMAEMA | 79 | 1.93 | C6 E6 | No UV UV |

UV Crosslinking of Membranes

Solutions for UV cured membranes were modified by addition of 1 weight percent (based on polymer solids) TPO-L photo initiator, and the solution was stirred to dissolve the initiator. Membranes were then prepared as described above. After the drying step, membranes were passed through a Light Hammer (LHC10 Mark 2) UV processor (Fusion UV Systems Inc., Gaithersburg, MD) using a "D-bulb" with three passes of the conveyor belt running at 50 feet per minute (15 meters per minute). After cure, clear solid coatings were obtained.

Successful crosslinking was demonstrated by solubility experiments (Table 3) and by alkali stability experiments on membranes with a range of IEC values (Table 4). Membranes were immersed in a 1M KOH bath for 24 hours at room temperature (RT). Higher IEC non-cross-linked membranes disintegrated and formed a soft flowing gel at the bottom of the bath, while cross-linked membranes remained intact and could be removed from the bath and handled (Table 4).

TABLE 3

Solubility of cross-linked and non-crosslinked membranes

| Copolymer | | Water (24 hours/RT) | Methoxypropanol (24 hours/RT) | Cure |
|---|---|---|---|---|
| 7 | Product precipitated in ethyl acetate | Soluble | Soluble | NA |
| 7 | Non-cross-linked membrane | Soluble | Soluble | No UV |
| 7 | Cross-linked membrane | Insoluble | Insoluble | UV |

TABLE 4

Alkali stability of membranes

| Copolymer | IEC (mmol/g) | Wt % crosslinking group | Non-crosslinked control in 1M KOH | Cross-linked membrane in 1M KOH |
|---|---|---|---|---|
| 5 | 1.92 | 7.1 | C3 Intact | E4 Intact |
| 7 | 2.25 | 6.7 | Disintegrated | Intact |
| 8 | 2.73 | 17.4 | Disintegrated | Intact |
| 9 | 2.93 | 5.6 | Disintegrated | Intact |

Successful cross-linking was demonstrated by improvements in mechanical properties vs. non-cross-linked analogs (Table 5). Increased stress at break values were demonstrated for UV-cured 2DEAEM membranes (Examples 1-4) versus a PS-VBC-TMIM-DVB control membrane C1A, and versus analogous 2DEAEM membranes that had not been exposed to UV (Comparative Examples C2 and C3). Likewise, increased stress at break values were demonstrated for UV-cured 3DMAPMA and 3DMAEMA membranes (Examples 5 and 6) versus a PS-VBC-TMIM-DVB control membrane C1A, and versus analogous 3DMAPMA and 3DMAEMA membranes that had not been exposed to UV (Comparative Examples C5 and C6).

TABLE 5

Tensile performance and swell in water for membranes

| Membrane | Elongation (%) | Stress at break (MPa) | Modulus (MPa) | Dimensional Swell (x, y) | Dimensional Swell (z) |
|---|---|---|---|---|---|
| C1 | 42 | 2.4 | 21 | 25 | 30 |
| E1 | 31 | 3.2 | 27 | 24 | 36 |
| E2 | 37 | 3.5 | 32 | 22 | 31 |
| C2 | 20 | 4.7 | 75 | 14 | 18 |
| E3 | 23 | 6.4 | 98 | 10 | 21 |
| C3 | 69 | 3.0 | 18 | 26 | 42 |
| E4 | 52 | 5.7 | 42 | 18 | 22 |
| C4 | 5 | 4.0 | 219 | 0 | 11 |
| C5 | 86 | 2.2 | 17 | 40 | 35 |
| E5 | 5 | 2.6 | 102 | 18 | 16 |
| C6 | 34 | 1.8 | 14 | 50 | 79 |
| E6 | 8 | 3.1 | 77 | 20 | 33 |

Ionic conductivity is maintained in cross-linked membranes (Table 6).

TABLE 6

Ionic conductivity in water for membranes

| Membrane | Ionic conductivity in Cl⁻ form (mS/cm) |
|---|---|
| C1 | 20 |
| E1 | 15 |
| E2 | 14 |
| C2 | 15 |
| E3 | 10 |
| E4 | 10 |
| E5 | 11 |
| E6 | 11 |

What is claimed is:

1. A crosslinkable copolymer comprising:
   a) first monomeric units of Formula (I)

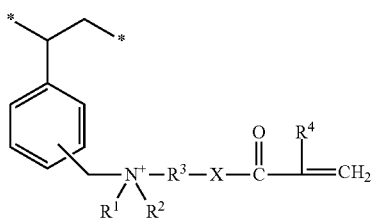

(I)

wherein
   $R^1$ is an alkyl;
   $R^2$ is an alkyl;
   $R^3$ is an alkylene;
   $R^4$ is hydrogen or methyl;
   X is oxy or —NR— where R is hydrogen or alkyl; and
   b) second monomeric units of Formula (II)

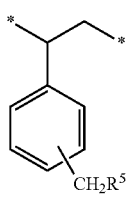

(II)

wherein
   $R^5$ is a cationic, nitrogen-containing group free of a polymerizable group; and
   c) third monomeric units of Formula (III-1), Formula (III-2), or a mixture thereof

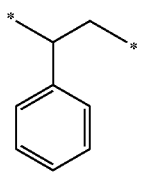

(III-1)

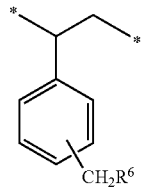

(III-2)

wherein
   $R^6$ is halo, hydroxy, or alkoxy; and
   wherein any cationic group in the copolymer has a corresponding anionic group and wherein each asterisk (*) is the point of attachment to another group or monomeric unit in the copolymer.

2. The crosslinkable copolymer of claim 1, wherein $R^5$ of the second monomeric units is a cationic, nitrogen-containing heterocyclic group.

3. The crosslinkable copolymer of claim 2, wherein the cationic, nitrogen-containing heterocyclic group is a) imidazolium substituted with one or more alkyl groups, b) pyridinium, or c) pyridinium substituted with one or more alkyl groups.

4. The crosslinkable copolymer of claim 1, wherein 20 to 50 mole percent of the monomeric units in the crosslinkable copolymer are cationic monomeric units of Formula (I) and Formula (II).

5. The crosslinkable copolymer of claim 4, wherein 1 to 95 percent of the cationic monomeric units are of Formula (I).

6. The crosslinkable copolymer of claim 4, wherein 5 to 20 percent of the cationic monomeric units are of Formula (I).

7. The crosslinkable copolymer of claim 1, wherein the copolymer comprises at least 50 mole percent third monomeric units of Formula (III-1), Formula (III-2), or mixtures thereof.

8. The crosslinkable copolymer of claim 1, wherein the copolymer comprises 50 to 80 mole percent third monomeric units of Formula (III-1), Formula (III-2), or mixtures thereof.

9. The crosslinkable copolymer of claim 8, wherein 55 to 70 percent of the third monomeric units are of Formula (III-1) and 30 to 45 percent of the third monomeric units are of Formula (III-2).

10. The crosslinkable copolymer of claim 1, wherein the crosslinkable copolymer comprises 1 to 10 mole percent monomeric units of Formula (I), 10 to 49 mole percent monomeric units of Formula (II), 50 to 80 mole percent monomeric units of Formula (III-1), and 0 to 20 mole percent monomeric units of Formula (III-2) based on total moles of monomeric units in the crosslinkable copolymer.

11. A crosslinked copolymer comprising a crosslinked reaction product of the crosslinkable copolymer of claim 1.

12. An anion exchange membrane comprising the crosslinked copolymer of claim 11.

13. The anion exchange membrane of claim 12, further comprising a catalyst layer adjacent to a first major surface and/or a second major surface of the anion exchange membrane.

14. An electrochemical device comprising:
   an anode;
   a cathode; and
   a membrane positioned between the anode and cathode, wherein the membrane is of claim 12.

15. A method of making a crosslinked copolymer, the method comprising:
- providing a precursor copolymer comprising
  - monomeric units derived from styrene; and
  - monomeric units derived from vinylbenzyl halide;
- reacting the precursor copolymer with a base composition to form a crosslinkable copolymer, wherein the base composition comprises
  - a) a first nitrogen-containing based of Formula (IV)

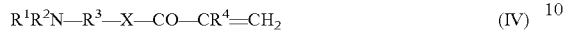
  $$R^1R^2N-R^3-X-CO-CR^4=CH_2 \quad (IV)$$

where $R^1$ and $R^2$ are each independently an alkyl, $R^3$ is an alkylene, X is oxy or —NR—
  where R is hydrogen or alkyl, and $R^4$ is hydrogen or alkyl; and
  - b) a second nitrogen-containing base, wherein the second nitrogen-containing base is free of a polymerizable group; and
- mixing the crosslinkable copolymer with a photoinitiator to prepare a crosslinkable composition; and
- exposing the crosslinkable composition to ultraviolet radiation to form the crosslinked copolymer.

* * * * *